United States Patent
Bartz et al.

(10) Patent No.: US 7,194,441 B2
(45) Date of Patent: Mar. 20, 2007

(54) RFID TRANSPONDER DISPENSER AND AUTHORIZER

(75) Inventors: Thomas R. Bartz, Lynden, WA (US); Melvin M. Lee, Auburn, WA (US)

(73) Assignee: Accelitec, Inc., Bellingham, WA (US)

( * ) Notice: Subject to any disclaimer, the term of this patent is extended or adjusted under 35 U.S.C. 154(b) by 0 days.

(21) Appl. No.: 11/275,652

(22) Filed: Jan. 20, 2006

(65) Prior Publication Data

US 2006/0106735 A1    May 18, 2006

Related U.S. Application Data

(63) Continuation of application No. 10/615,750, filed on Jul. 8, 2003, now Pat. No. 7,069,251.

(60) Provisional application No. 60/393,860, filed on Jul. 8, 2002.

(51) Int. Cl.
  *G06Q 99/00* (2006.01)
(52) U.S. Cl. .............................. 705/75; 705/50; 705/51
(58) Field of Classification Search .................. 705/75, 705/50, 51
  See application file for complete search history.

(56) References Cited

U.S. PATENT DOCUMENTS

| | | |
|---|---|---|
| 5,696,908 A | 12/1997 | Muehlberger et al. |
| 5,862,222 A | 1/1999 | Gunnarsson |
| 5,868,236 A | 2/1999 | Rademacher |
| 6,070,156 A | 5/2000 | Hartsell, Jr. |
| 6,073,840 A | 6/2000 | Marion |
| 6,116,505 A | 9/2000 | Withrow |
| 6,122,625 A | 9/2000 | Rosen |
| 6,298,336 B1 | 10/2001 | Davis et al. |
| 6,328,207 B1 | 12/2001 | Gregoire et al. |

(Continued)

FOREIGN PATENT DOCUMENTS

EP    1359523 A1    11/2003

(Continued)

OTHER PUBLICATIONS

IBM Technical Disclosure Bulletin, "Wireless Point of Sale Terminal Input/Output Utilizing Radio Frequency Identification Communication and Solar or Battery Power," vol. 40, Mar. 1, 1997.

*Primary Examiner*—Elisca Pierre Eddy
(74) *Attorney, Agent, or Firm*—Lee & Hayes, PLLC

(57) ABSTRACT

A RFID transponder dispenser and authorizer (RTDA) system for distributing and activating an RFID Transponder at a point of purchase. The system has a storage for Transponders and Transponders in the storage. It also has at least one electronic data reader, network access to a processor system, and an application for customer data verification, electronic data and account data verification across the network at the processor, an interface to the RTDA apparatus to control dispensing of Transponders, and receiving an account verification code and an activation confirmation code from the processor. The RTDA reads customer electronic account data, verifies same and verifies the account is valid, dispenses a Transponder to a customer, reads the Transponder ID code, and associates the Transponder ID code with the customer's electronic account data in a unique customer record in an RFID database, and receives an account activation confirmation code and displays confirmation of activation to the customer.

20 Claims, 25 Drawing Sheets

U.S. PATENT DOCUMENTS

| | | |
|---|---|---|
| 6,329,920 B1 * | 12/2001 | Morrison et al. ........ 340/573.3 |
| 6,647,376 B1 * | 11/2003 | Farrar et al. .................. 705/45 |
| 6,869,020 B2 | 3/2005 | Foth et al. |
| 2003/0025600 A1 * | 2/2003 | Blanchard ................... 340/539 |
| 2004/0182918 A1 * | 9/2004 | Meehan .................... 235/31 R |

FOREIGN PATENT DOCUMENTS

| | | |
|---|---|---|
| JP | 405291997 A | * 11/1993 |

* cited by examiner

RFID TRANSPONDER DISPENSER AND AUTHORIZER

This application is a continuation of coassigned and copending U.S. patent application Ser. No. 10/615,750, entitled "RFID Transponder Dispenser & Authorizer," filed on Jul. 8, 2003 now U.S. Pat. No. 7,069,251, which, in turn, claims priority of U.S. Provisional Application No. 60/393,860 filed Jul. 8, 2002. Priority is hereby claimed to this case under 35 U.S.C. section 120.

TECHNICAL FIELD

This invention relates to Radio Frequency Identification (RFID) transponders, and more particularly to a method and apparatus for controlled dispensing and real time activation of RFID transponders for fast service businesses, and for maintenance of such transponders and associated electronically processed accounts.

BACKGROUND OF THE INVENTION

Major oil marketers have historically used proprietary credit card programs to build customer loyalty. Customers holding branded credit cards, such as Mobil or Chevron gas cards, will be more likely to return to those branded gasoline outlets to make their fuel purchases.

The early 1980's saw an aggressive move by all the major oil marketers to automate their gasoline stations by replacing the traditional mechanical fuel dispensers with electronic dispensers that can be reset by a remote operator. However, customers still had to pay at a cashier booth located either in the station office building or at a kiosk on the fueling islands. Gilbarco, a leading supplier of fuel dispensing equipment, launched their CRIND (card reader in dispenser) technology in 1988, which enabled customers to pay at the pump with their credit cards. The first implementation of card readers depended on dial up modems to connect the station's point of sale (POS) system to the credit card authorizer network. These connections were upgraded to ISDN connections and now the majority of stations communicate POS transactions via VSAT (very small aperture terminal) connections. Throughout this evolutionary process, the major oil marketers were always focused on expediting the fueling transaction for their customers.

RFID technology was introduced to the fueling customers in May of 1997 when Mobil launched the Mobil Speedpass program. Mobil Speedpass enabled Mobil customers to link their bank credit cards, such as VISA or MasterCard, or their Mobil gas card to their Mobil Speedpass account. Mobil retail outlets equipped for Speedpass installed RFID readers at the pumps internal with the CRINDs. Mobil Speedpass customers are issued RFID transponders in several format choices which are read by the RFID readers mounted in the pumps. This, again, expedited their customers' fueling transactions while still maintaining a high level of security.

Shell Canada is currently deploying RFID technology at their stations through Shell's EasyPAY program. Domestically, Shell began testing RFID in Florida and Ohio in 1998 and 1999, respectively. Phillips 66 has also been testing RFID technology in their Kicks 66 stores in the Kansas City metropolitan area since August of 2001.

Other market tests of RFID payment methods include national brand names such as McDonalds, Pizza Hut, Taco Bell, KFC, VISA and MasterCard.

ExxonMobil and Shell Canada are aggressively promoting consumer adoption of their RFID systems. ExxonMobil currently has 5.5 million Speedpass users and are targeting to have 30 million users by 2006. Shell Canada is rapidly deploying RFID to all their sites in major metropolitan areas throughout Canada. These companies both cite faster and easier transactions at the pump and in store checkout among the advantages of RFID to entice their existing customers as well as new customers to subscribe to their respective programs. Yet, the actual process of signing up a new RFID subscriber is cumbersome and requires manual intervention on the part of the company through their outsourced fulfillment houses, network providers, and database managers.

Case Study: ExxonMobil Speedpass

There are currently 4 ways for a prospective new member to subscribe to Speedpass: online application, apply by phone, download and print/fax application form from the Speedpass website, or fill out a hardcopy application form available at ExxonMobil stations and mail the form in.

Any of these options can take from 5 to 10 business days from the date the application is completed until the RFID transponder is in the customer's hands. There is no method to process a member application at the point of purchase. Upon receipt of the new RFID transponder, the new member must call Speedpass to activate the transponder before it can be used. The new transponder can be used almost immediately upon calling Speedpass.

Case Study: Shell Canada EasyPay

There are currently 5 ways for a prospective new member to subscribe to EasyPay: online application, apply by phone, download and print/fax application form from the Shell Canada EasyPay website, or fill out a hardcopy application form available from Shell EasyPay stations and mail the form in. Any of these methods take from 7 to 10 business days to get the RFID transponder into the customer's hands. In addition to these options, some EasyPay station operators have stepped up the promotion and assist the prospective member with the application form on site and fax in the completed form for processing from the store before the customer leaves. In this scenario, the new member leaves the station with his/her new RFID transponder in possession; however, that transponder cannot be used until it is activated.

After the new RFID transponder is received, new Shell EasyPay members activate their transponders by calling Shell EasyPay. Once the call is made, the transponders may be used after 2:00 AM of the following day. New members who are given their transponders at a Shell EasyPay station must wait 2 days before they can call to activate their transponders.

The above examples illustrate a severe limitation to the RFID deployment initiatives put in place by major corporations. The inability of the current process to place an RFID transponder, ready for use, into a prospective member's hands at the point of purchase hinders the rate of deployment and may, in fact, discourage some potential members from ever subscribing to the program.

What is needed is a method and mechanism to distribute and maintain RFID transponders to the customer and activate those transponders immediately and at the point of purchase. The RFID Transponder Dispenser/Authorizer does just that.

DISCLOSURE OF THE INVENTION

The RFID Transponder Dispenser/Authorizer (RTDA) is advantageously directed to those companies within the Global Retail Petroleum and High Volume Retailer (HVR) and grocery markets and Quick Serve Restaurants (QSR) who are deploying RFID programs or are planning to deploy RFID programs to their retail outlets.

The RFID Transponder Dispenser/Authorizer provides a secure method and mechanism to deploy to a retailer's customers RFID transponders (sometimes referred to herein simply as Transponder or Transponders) that are immediately in the customer's hand at the Point of Purchase (PP), activated, and ready to use immediately for purchases. By leveraging current communications technologies and electronic financial authorization protocols, the RTDA can reduce the time it takes to add new customers to the Retailers' RFID subscription base from weeks to minutes; and at significant cost savings.

The RTDA facilitates the customer's application process to put a Transponder into a customer's possession right at the Point of Purchase. Successful deployment of any retailer RFID program is believed to depend upon building a subscriber base of critical mass within a critical time frame. One obstacle to doing so is the reluctance of existing and new customers to endure an application process for becoming a new RFID subscriber that either is, or is perceived to be, difficult or even just bothersome. By automating much of the application process, the RFID Transponder Dispenser/Authorizer encourages such customers to subscribe to the Retailer's program.

The RTDA also facilitates maintenance of customer RFID accounts. By employing the same technologies and protocols used to activate new customer accounts, the RTDA enables those same customers to maintain their accounts easily and without suffering through an automated phone queuing process, or having to go on line to do so.

Retailers will advantageously use the RTDA to rapidly deploy their RFID initiatives to their existing and new customer base; to build customer loyalty; and to promote sales at larger volumes. Customers will advantageously use the RTDA to facilitate their RFID application process, and to obtain and authorize for use, and maintain, their secure RFID transponders and associated accounts. Existing RFID subscribers use the RTDA to maintain their RFID accounts with the Retailer, performing tasks such as updating their profile or changing the linked credit card or checking account, thus avoiding other cumbersome phone or online authorization and maintenance processes.

RFID Transponder Dispenser/Authorizer Process

Note that an advantageous message or other display at the gas pump or other product display or vending site can inform the Customer of advantages of using an RFID transponder, and then instruct the Customer to get more details and obtain his/her own transponder at the in-store RTDA.

Note also that desirably the RTDA in passive mode displays "Welcome" and "Press here to start transponder authorization process" (or the like) messages, and secondary frames visible on the RTDA touch screen are scrolling or looping with infotainment such as entertainment and/or current information like weather, traffic, news and/or other targeted informational messages.

So, suppose a customer has decided to obtain and activate and RFID transponder for their personal use at the select store (or other stores in the chain, or in fact, any other stores in any RFID program association of stores). The Customer initiates the new RFID account signup and RFID dispensing and activation process (by way of illustration, and not be way of limitation) as follows:

RFID Account Signup Process

After the Customer chooses to signup for a new RFID account and first activates the touch screen prompts, the RFID account signup sub-process begins. The screen refreshes to instruct the Customer to swipe his/her credit card or insert a check having standard MICR imprinted account information on it into the respective reader.

And the Customer swipes (for example) a credit card through card reader. The process for activation using a MICR encoded blank check is generally identical, except as otherwise noted herein, and except that the coded information is generally particular to EFTs and the ACH automated banking system.

The magnetic strip (Magstripe) track data (or MICR data) is read and preferably stored in volatile memory onboard the RFID Transponder Authorizer. Optionally, the data just read is transmitted or uploaded for immediate verification as an active, valid account. If the account information is invalid, or the account not active or in any way flagged, the application process can then be selectably interrupted, sent along an alternate path, or terminated.

The display then brings up a series of application screens with prompts and interactive help to guide the customer through the application process. The data read in the preceding step is then displayed for Customer verification. The Customer then completes the on screen application form using touch screen prompts and optional keyboard, including such data as billing address (used to verify account), driver's license number and state (used for collection on ACH transactions), birthdate (for account security purposes), email address (optional), phone number (optional for preferred loyalty program membership), and various Customer preferences.

All entered information is preferably stored into volatile memory onboard the RTDA, and the Customer optionally associates their photo to the transponder account for additional security and future enhanced services, and the RTDA onboard webcam takes a digital photo and stores it in volatile memory.

The screen refreshes to display a Terms of Use Agreement and prompts customer to accept or decline. If the Customer declines the Terms of Use Agreement, the transaction is terminated, and a message is displayed to invite to Customer to apply at a later date. The RTDA prints out a confirmation of the cancelled transaction for the Customer, and the screen refreshes to the Customer Service options where the Customer can learn more about the Retailer's RFID program, or even give feedback to the Retailer.

If the Customer accepts the Terms of Use Agreement, a datum representing acceptance of the Terms of Use is optionally stored, and the screen refreshes to instruct customer to wait while the request is being processed (and optional content can be presented on screen at this time). Meanwhile, the RTDA establishes a connection to an appropriate processor network (that network and its computer processing equipment and associated databases herein generically referred to in aggregation as the Processor) via VSAT, or terrestrial communications link, or the like, and information so far stored in RTDA volatile memory for this transaction is transmitted to the Processor via the communications link.

The Processor updates all this Customer information to a new record in the Processor's RFID program database and assigns the record a record locator ID (RecLocID) code. The new Customer record is also then queued for activation by the Processor, depending on the following event steps.

If the credit card or check presented is verified as an active account by the Processor on the Processor's financial network access, the Processor returns a selected validation code (or "valid flag", one of which is sometimes also referred to herein as a "true bit") based upon whether the account is valid, valid but with mismatched address, or invalid, or such other codes as will occur to those skilled in the art. The RTDA looks at the value of the valid flag to determine which logical routine to next take the Customer through. The RecLocID transmitted down to the RTDA by the Processor is used to later identify the returning transaction at the point when the transponder ID is returned to the Processor.

If the valid flag indicates that the credit or debit account info and user verification data match the corresponding financial institution data on file, the RTDA continues through the process of dispensing a transponder and continuing with its account activation. The transponder is dispensed after receipt of the correct valid flag from the Processor. The transponder as stored in the RTDA contains a unique encrypted ID number, and the customer takes the dispensed transponder and waves it in front of the RTDA RFID reader. The unique Transponder ID is thus read and then transmitted, along with the RecLocID back to the Processor, where the Processor uses the RecLocID to locate the correct record against accounts queued for activation, and then activates the corresponding Customer account. Account activation happens thus at the Processor, or back end, in the Processor database.

If the credit card or check is rejected by the Processor on the network, the Processor returns a false bit with one of several possible reasons, such as the uploaded billing address of the account does not match the address of record. In this case, the screen display optionally prompts the Customer to re-enter billing address at least once. The RTDA then resubmits newly entered information for verification. If the false bit is because the account is closed or otherwise restricted, the screen displays a "Declined" message with instructions for the Customer to call her financial institution or the Retailer's RFID Program Customer Service, and the Customer is presented with the option to signup for a new RFID account using a different method of payment. If the Customer declines this option, the transaction and connections are terminated. This message times out after a predetermined interval and the RTDA resets.

Alternately, upon receipt of a true bit, the RecLocID is preferably stored into volatile memory resident onboard the RTDA, and a printed copy of the Terms of Use Agreement is presented to the Customer, while a new RFID transponder is dispensed into the output tray. The screen optionally refreshes to display "Please take transponder and press OK to continue", or the like, and the Customer takes the transponder from dispenser tray and presses "OK" on touch screen display, or the RTDA otherwise optionally senses that the Transponder has been taken from the output tray. The screen instructs the Customer to wave his transponder in front of the reader, and when the Customer waves his new Transponder, the RTDA performs a handshake with RFID transponder, reads the transponder ID code stored in or otherwise resident in the Transponder, and preferably stores it into volatile memory as well.

An acknowledgment panel optionally illuminates to indicate a successful read, and the screen refreshes to instruct Customer to wait while the transaction is being processed. The RTDA transmits the encrypted transponder ID code, along with the RecLocID, to the RFID Program database via the previously established communications link. The Processor now updates the queued Customer record with the transponder ID code.

RFID Transponder Authorization Process

When automatic authorization of a new RFID account linked to a credit card or bank account is the default Processor mode of operation, the Processor transmits to the RTDA an activation code or "activation bit" corresponding to the state of approval of the new account. The screen optionally displays a "Thank You" message or the like to notify the Customer his new RFID transponder is ready for immediate use.

When the Processor is set to batch the database updates, a different activation code will cause a message to notify the Customer that his RFID transponder will be ready for use after the next batch interval (i.e. "after 12:00 am" or "in 24 hours"). This message times out after a predetermined interval, the communication link is terminated, and the RFID Transponder Dispenser/Authorizer resets.

When authorization of an RFID account linked to a credit card or bank account is optionally set up to require some kind of in-store cashier verification of Customer ID, final authorization of the Transponder is queued in the Processor's RFID Program database pending verification of Customer ID by the cashier. The screen displays a "Thank You" message or the like and instructs the Customer to activate his RFID transponder at the cashier station. (This message also optionally times out after a predetermined interval, and the communication link is terminated, and the RFID Transponder Dispenser/Authorizer resets.)

The cashier verifies the Customer ID, and asks the Customer to tap or wave his Transponder on a small reader mounted at cash register area, the encrypted transponder ID code is read and transmitted to the Processor via the network, and the Transponder ID code is verified as part of a pending activation by the Processor. The Processor returns a true bit to the cashier terminal along with a request to enter the store's authorization code, and the cashier enters the store authorization code. The store authorization code is transmitted to the Processor where it is verified and the queued new account for the transponder ID is activated in the RFID Program database. (Authorization codes are assigned to each specific store in the network. This allows tracking of success of RFID promotion on a per store basis and requires 3rd person verification of customer ID.)

The process to obtain and activate the new RFID transponder is completed in minutes including RFID transponder authorization by Retailer's store operator. Some Retailer networks batch activation of newly issued RFID transponders. In the case of such a Retailer employing the RFID Transponder Dispenser/Authorizer at their sites, the RFID transponders dispensed will be activated upon batching by the Retailer network.

One embodiment of the disclosed RFID system is an RFID Transponder Dispenser/Authorizer (RTDA) suitable for a plurality of products that has a credit card reader (and optional MICR check reader), a RFID antenna and reader, a barcode reader, a printer, a holder for holding a plurality of RFID transponders, with new transponders for dispensing to qualified customers, and a mechanism for dispensing the RFID transponders. The system advantageously also includes PC hardware and software, a CPU and mainboard, an optional harddrive, and a LCD touchscreen with a graphical user interface. It may also include network interface hardware and software, whereby any RFID transponder dispensed is also 'read' by the RFID reader and then verified along with select customer data by the Retailer's RFID customer database.

Another embodiment of the disclosed RFID system captures customer information data via a magnetic strip credit card reader, or a MICR check reader, and via supplemental and confirming manual input, and formats and encrypts this data, and communicates with a Processor or authorizer network through the included network hardware. This data system allows customers to choose to receive and authorize RFID transponders via a graphical user interface, via an authorizer network.

An alternate, or variant, system automates programming of selected RFID transponders in the RTDA with additional data such as unique encrypted user identification numbers, or customer preferences, or special customer selected features, or the like, and also transmits those numbers and other data to the operator's or retailer's RFID customer database.

This application also herewith incorporates by reference that certain U.S. Provisional Patent Application 60/393,860 filed Jul. 8, 2002, as if it was fully set forth herein.

An RFID transponder dispenser and authorizer (RDTA) system is disclosed for distributing and activating an RFID Transponder at a point of purchase. The system has a storage for Transponders and Transponders in the storage. It also has at least one electronic data reader, network access to a processor system, and an application for customer data verification, electronic data and account data verification across the network at the processor, an interface to the RTDA apparatus to control dispensing of Transponders, and receiving an account verification code and an activation confirmation code from the processor. The RTDA reads customer electronic account data, verifies same and verifies the account is valid, dispenses a Transponder to a customer, reads the Transponder ID code, and associates the Transponder ID code with the customer's electronic account data in a unique customer record in an RFID database, and receives an account activation confirmation code and displays confirmation of activation to the customer.

The system advantageously includes a webcam or the like, a printer, an LCD touchscreen, and/or a barcode reader. The Transponder storage and dispensing mechanism preferably has more than one dispenser, where each dispenser selectably dispenses a different kind of Transponder, such as key fobs, smart cards and the like. Each Transponder is dispensed in a physically active mode, that is, capable of having its stored ID read by an RFID reader; activation, or the ability to actually use the Transponder for purchases, happens at a processor back end, when the Transponder ID is linked in a customer record with an valid credit card account or the like. This is a live or dynamic linkage of the Transponder and the credit card account. Once set up, with the Transponder in hand, no further calls or other customer action is required.

An RTDA apparatus is disclosed for distributing and activating an RFID Transponder at a point of purchase. It includes storage for Transponders and a supply of Transponders that are dispensed from the storage, network access to a processor system, a MICR reader, a credit/debit card reader, a bar code reader (or any other electronic data reader now known or later developed), an RFID reader, a touchscreen input device (on which can be displayed optional infotainment and the like), and a dispenser controller. The readers read customer financial account data and send it across the network to the processor system, and the RFID reader reads the unique Transponder code and sends it across the network to the processor system, such that the dispenser controller effects secure dispensing of a Transponder upon a verification from the processor. The upload sending of customer financial account data may optionally be delayed until all customer input is complete and an option Terms of Use agreement is accepted, or it may be uploaded immediately for immediate verification of validity of the customer payment account.

A method is disclosed for securely dispensing an RFID Transponder at a point of purchase for use by a customer, with the RFID Transponder having a unique ID code readable at the point of purchase. The method includes reading at the point of purchase and uploading customer selected electronic account data through a network to a processor, processor validation of the account data and sending back to the point of purchase a validation code and a record locator code, reading the validation code and selectably dispensing a Transponder to the customer if the code matches preselected criteria for dispensing, reading the dispensed Transponder ID code at the point of purchase and uploading it and the record locator code through the network to the processor. Processor activation of the Transponder ID is by association of the Transponder ID with the customer selected electronic account in a processor database record such that the customer account may be dynamically charged whenever the unique Transponder ID is associated with the customer database record for payment. The timing of activation can be immediate, batched (such as daily), or held for supplemental verification of the customer's ID for heightened customer security.

After verification of the customer payment account, the customer database record is preferably queued for later activation upon receiving a valid Transponder ID. Dispensing of the Transponder may advantageously be made conditional upon acceptance by the customer of a displayed terms of use.

The method optionally sends an activation confirmation code back to the point of purchase such that the customer is immediately advised as to the status of activation, based on the confirmation code. After the activation, the customer may at any time log in to the processor from the point of purchase to perform maintenance on the customer record at the processor database, such as by modifying the account, linking an additional transponder to the account, replacing a lost transponder, assigning the Transponder to a different customer financial account, updating the Transponder, and cancelling a Transponder.

Where the selected timing of activation is that activation is held for point of purchase cashier verification of customer ID, the customer is instructed to verify her own personal identification with the cashier and the cashier does so. Then the Transponder ID code is read again, either by a reader that is controlled by the cashier, and/or by any reader, but with the cashier inputting a store code to confirm his verification of the customer ID, and the Transponder ID and the store code if any are sent to the processor, such that the customer account may immediately thereafter be dynamically charged.

BEST MODE OF CARRYING OUT THE INVENTION

Figure 1A:
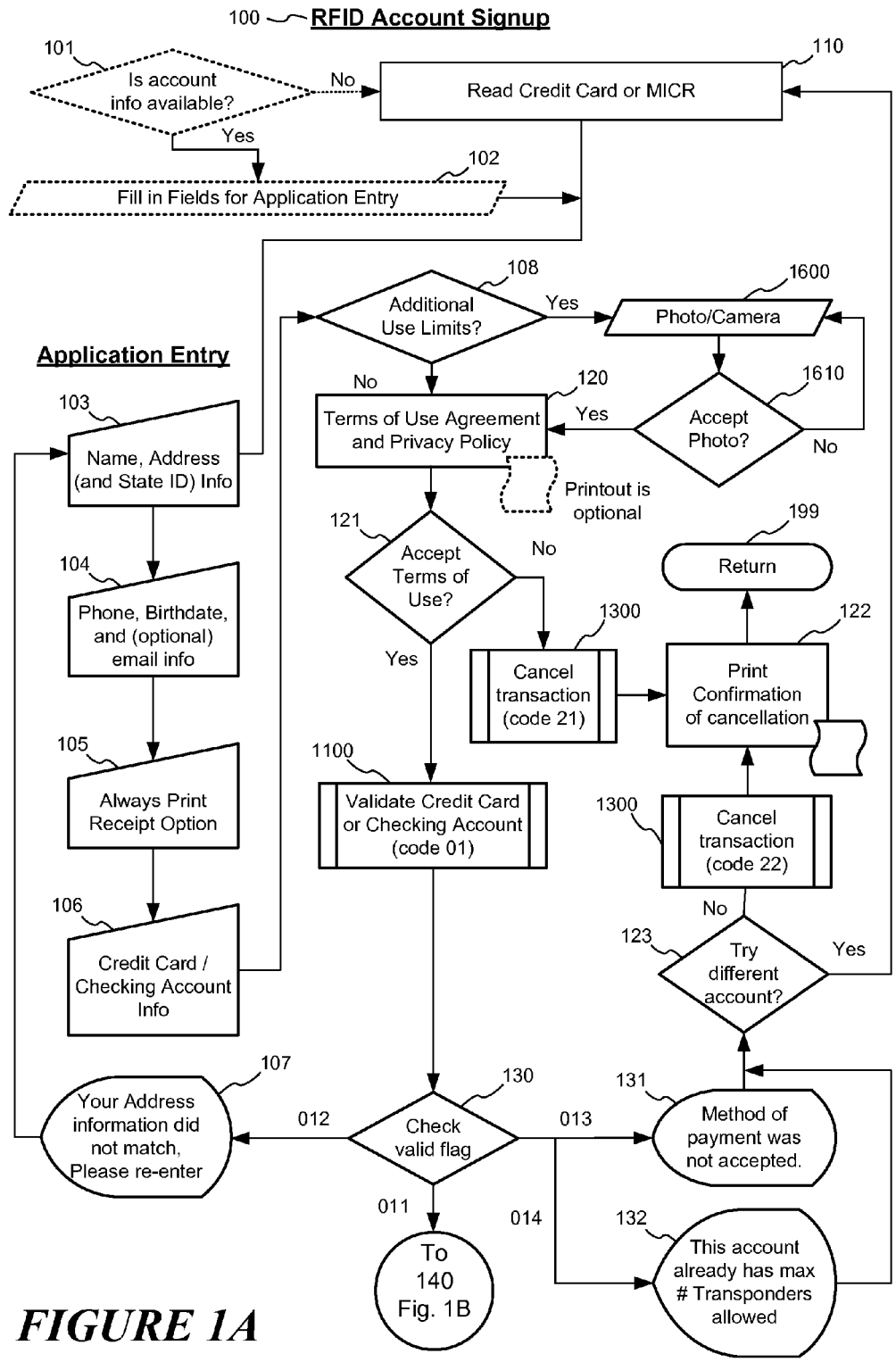
FIGS. 1A and 1B are a flow chart of the RFID authorization and activation process.

Turning now to the drawings, the invention will be described in a preferred embodiment by reference to the numerals of the drawing figures wherein like numbers indicate like parts.

Figure 4:
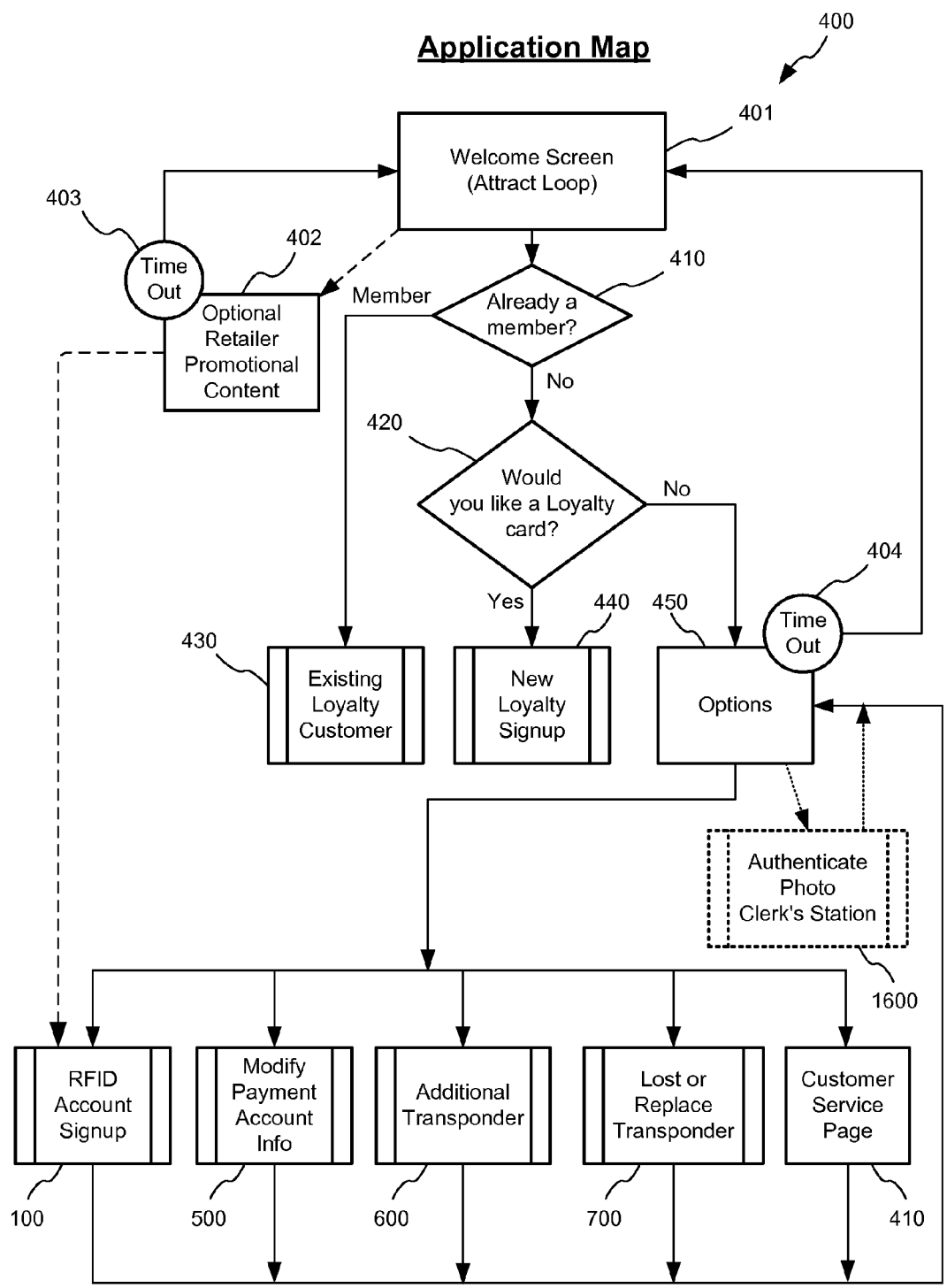
FIG. 4 is a flow chart of an overview of the RFID authorization and activation process.
Figure 5A:
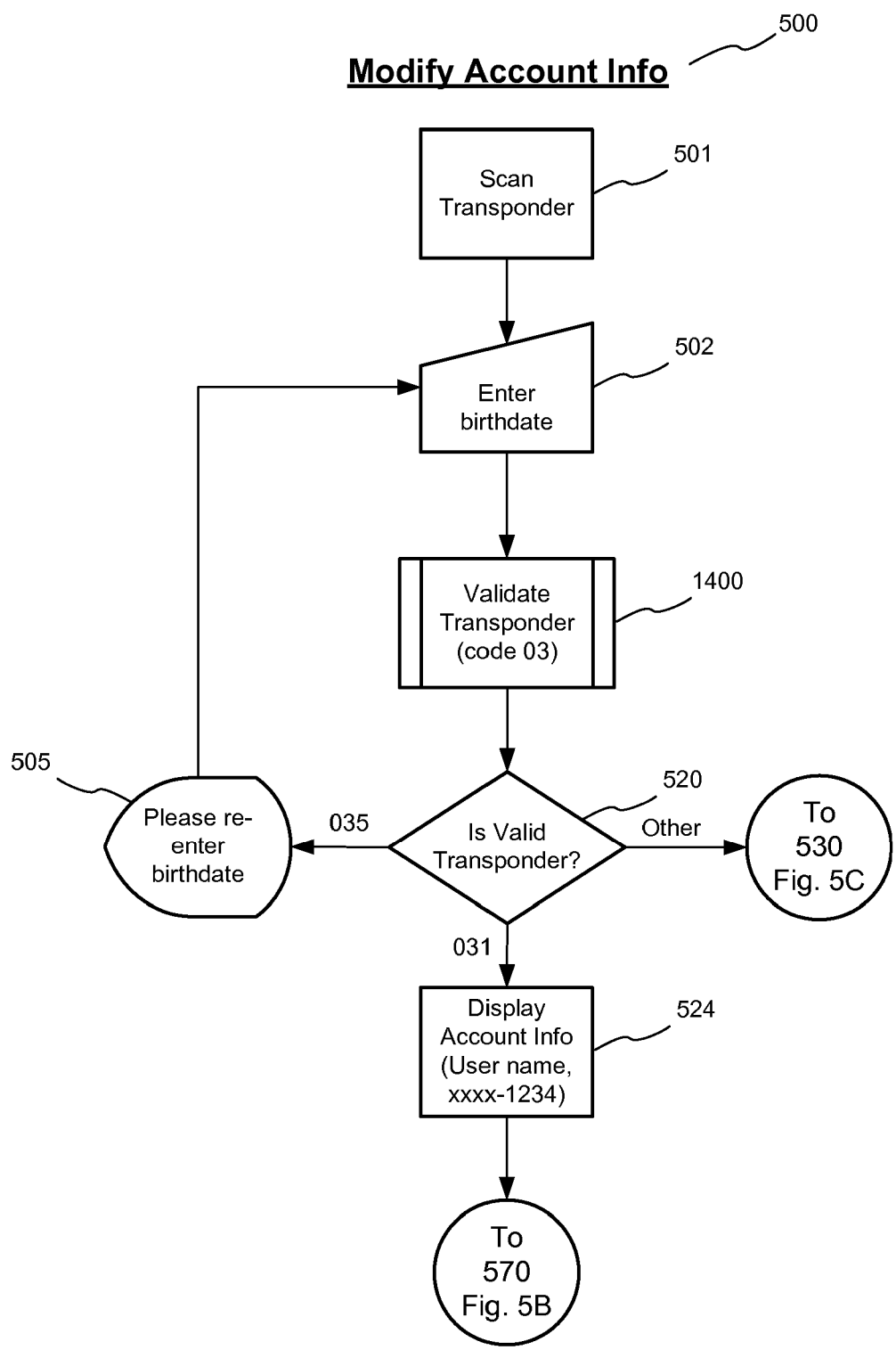
FIGS. 5A–5D are a flow chart of the Modify account process.
Figure 5B:
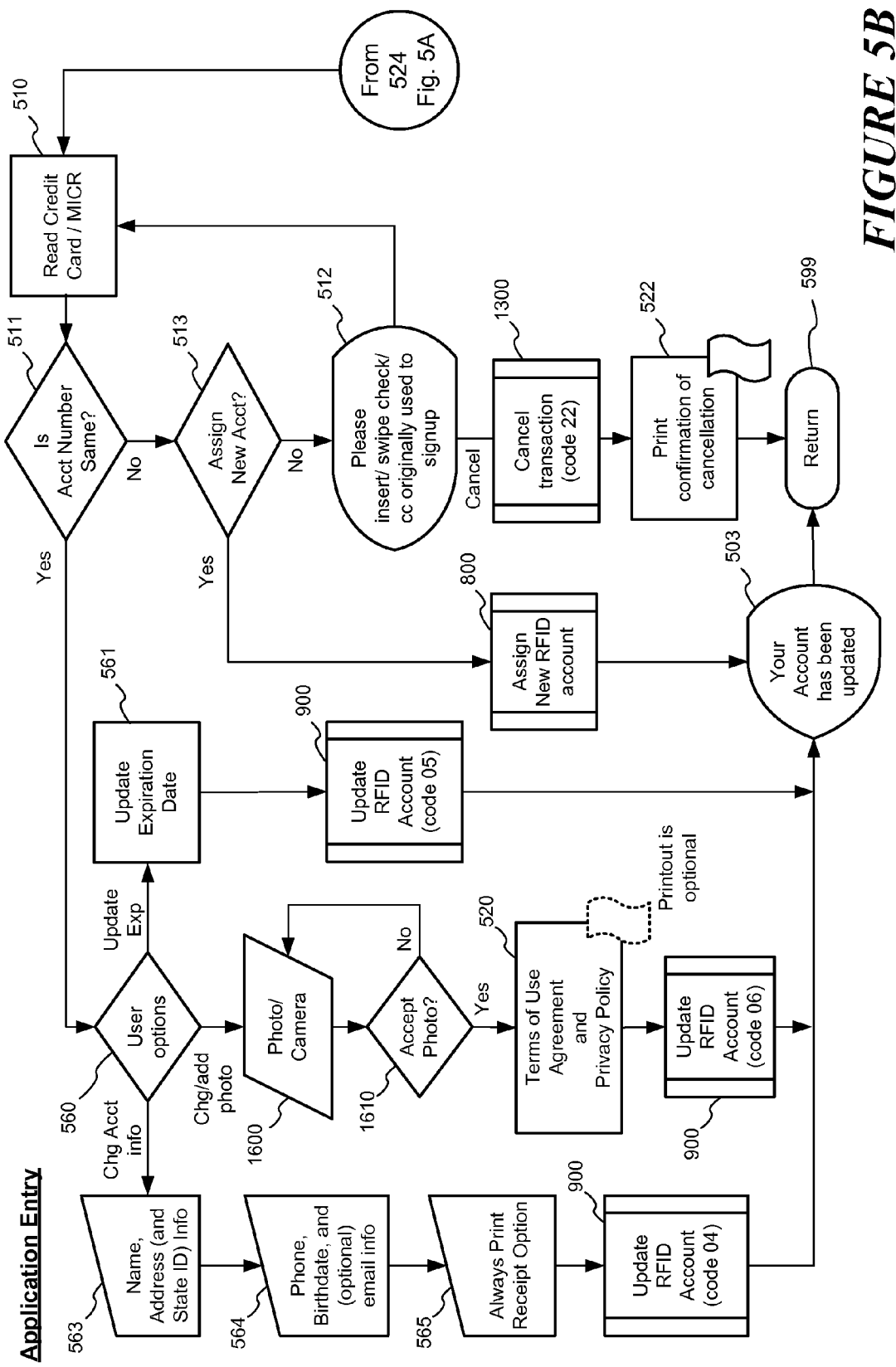
Figure 5C:
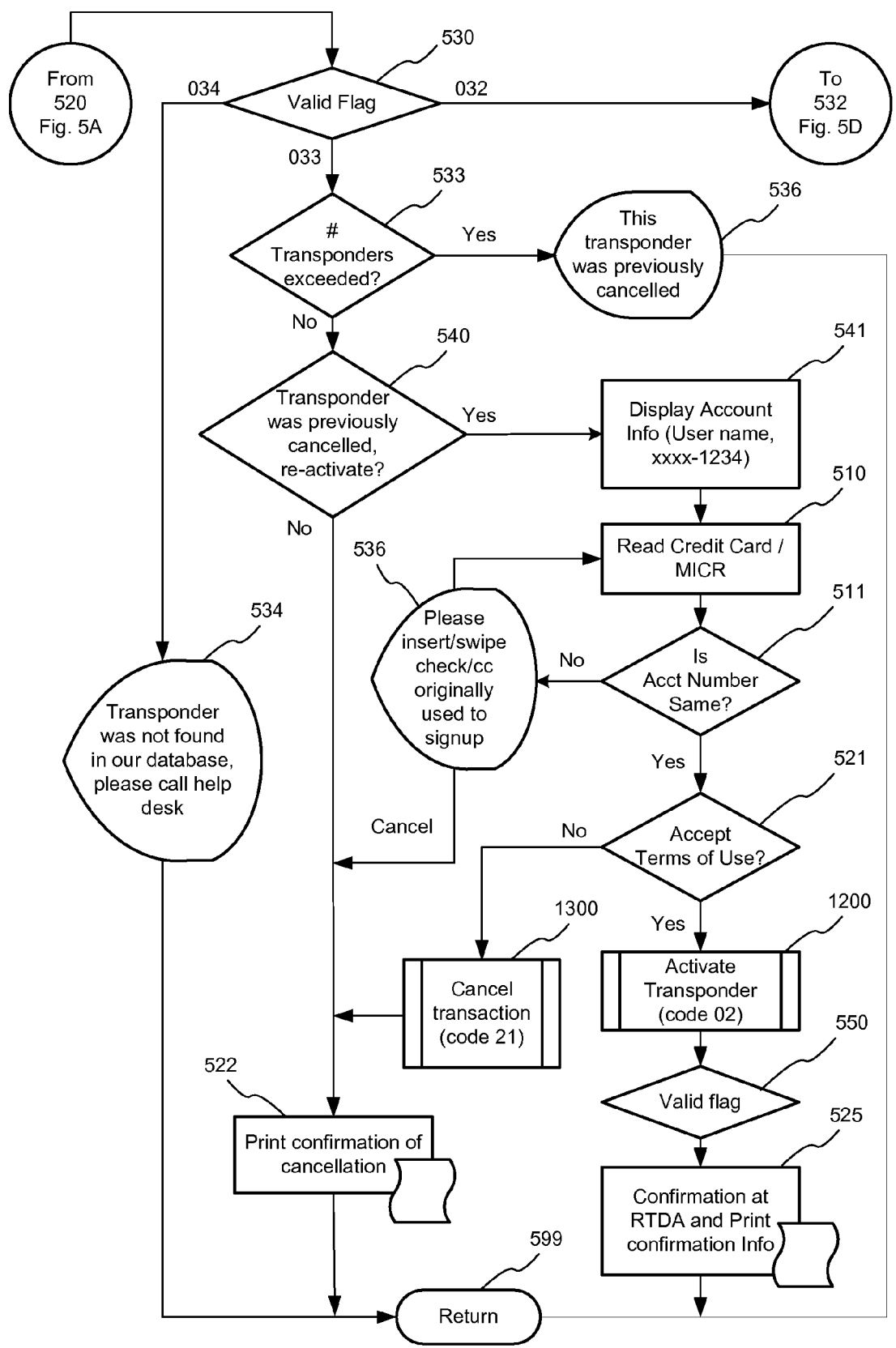
Figure 5D:
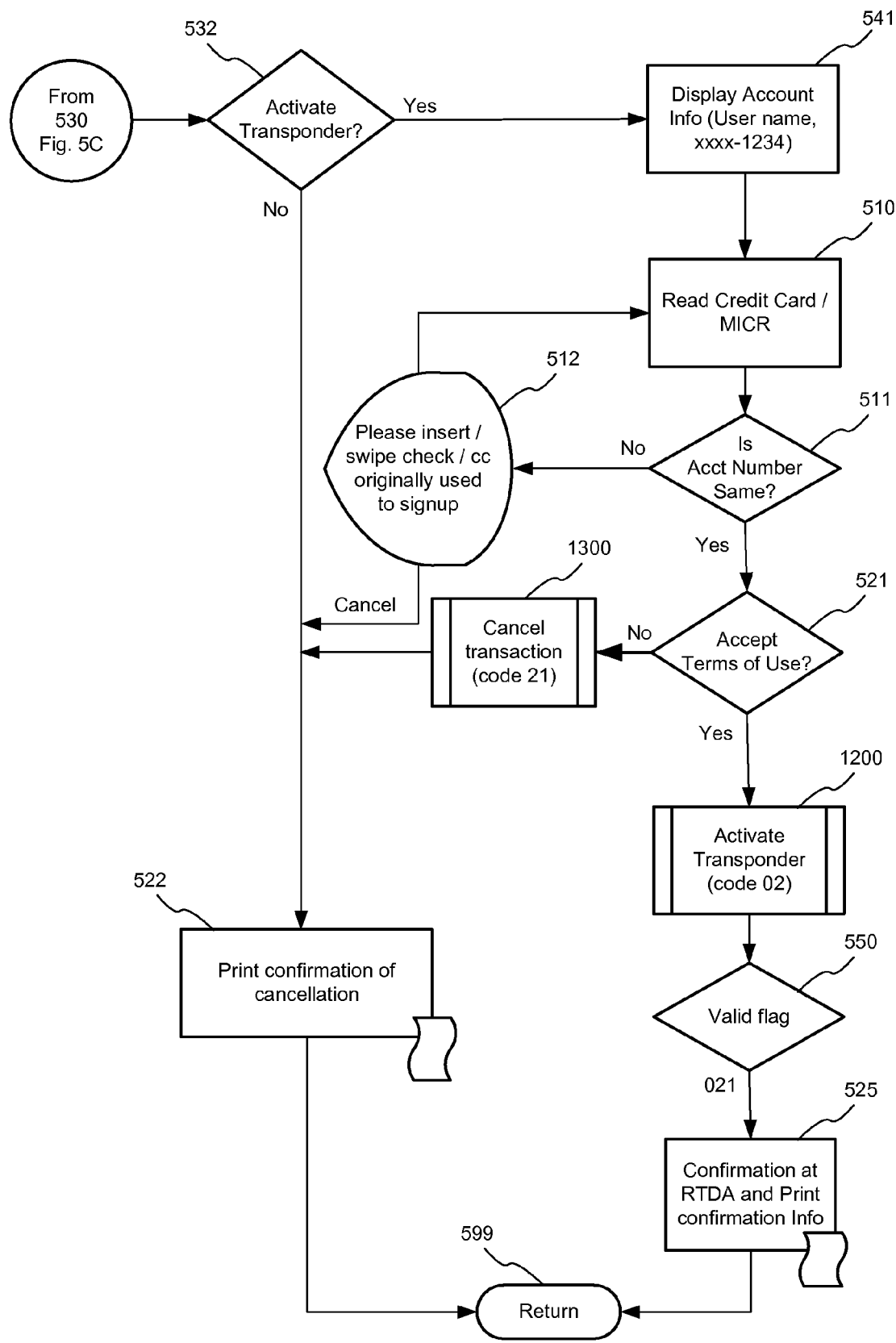

FIG. 4 is a system overview for the disclosed RTDA system 400. Welcome screen 401 runs in a customer attraction loop with optional retailer promotional content 402, mediated by time out counter 403. In some embodiments, after a customer activates the system, such as by touching the touch screen, they are asked if they are already an existing loyalty customer 410; if they are an existing loyalty customer 430, that part of the process ends. If they are not already members, they are asked if they would like to sign up 420 and then get an opportunity to sign up 440 if they want to, or proceed to other RTDA options 450, mediated by time out counter 404.

Principal sign up or use options for RTDA customers are RFID account signup 100 (see FIGS. 1A and 1B), modify payment account info 500 (see FIGS. 5A–5D), get an additional transponder 600 (see FIGS. 6A–6D), replace or just cancel a lost transponder 700 (see FIGS. 7A and 7B), and various other customer service 410 options (see FIGS. 8A, 8B, 9 and 10). Customers can also choose to authenticate a photo of themselves 1600 for association with their RFID account.

Figure 1B:
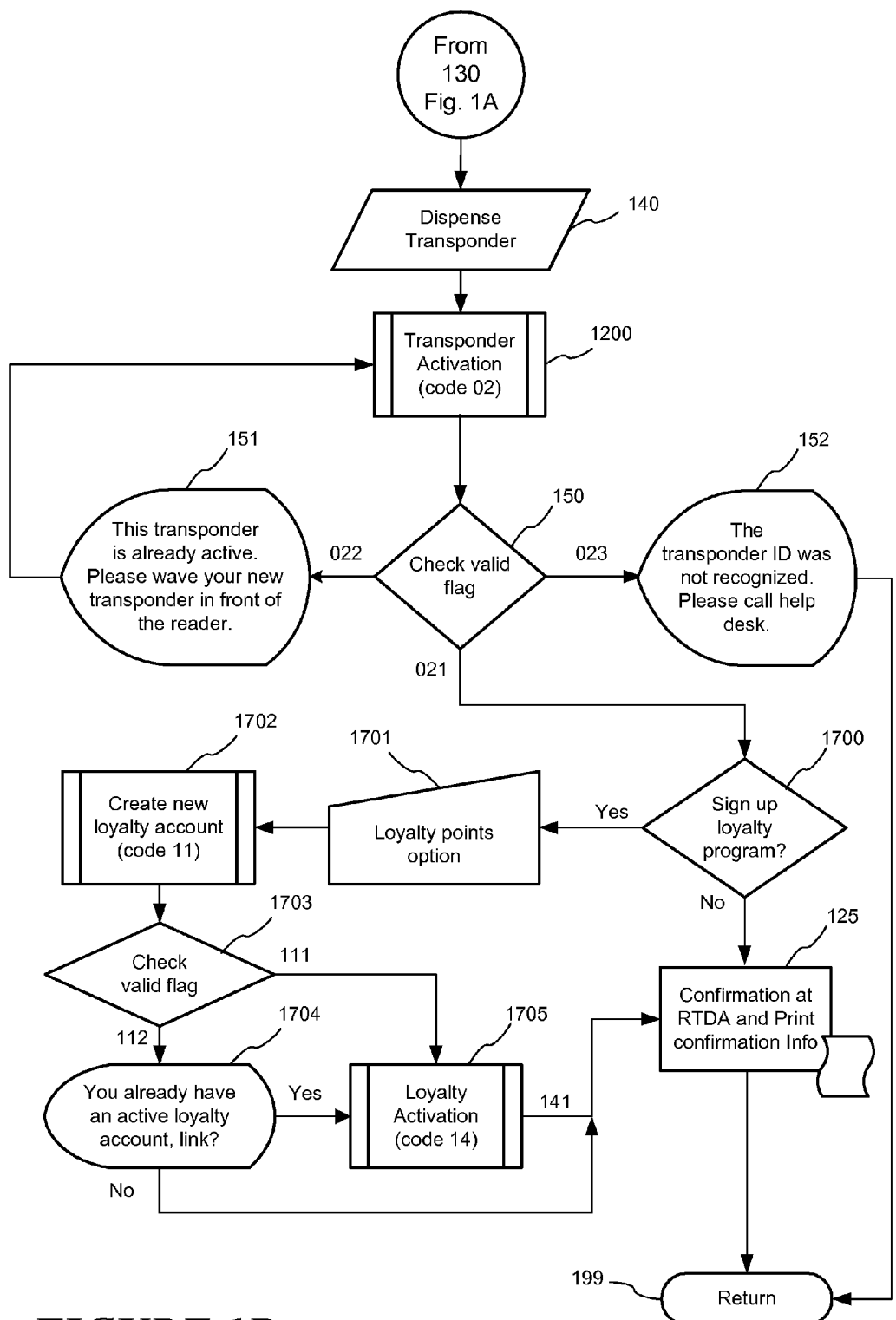

FIGS. 1A and 1B show a flow chart of RFID authorization and activation process 100. It should be noted that in general input information including credit card ISO or MICR ABA information that has been read is preferably stored in volatile onboard memory. Information is also preferably cleared from memory upon uploading to the processor database. It should also be noted that account information may in fact already be available if the customer enters this procedure from the Lost/Replace Transponder option and desires a replacement transponder. Having the information thus displayed advantageously allows the customer to quickly complete the process for a new transponder.

If account info is already available 101, then optionally the customer can fill in fields on screen for application entry 102; otherwise, the customer swipes a credit or debit card or MICR encoded check 110 in an appropriate reader, and then proceeds to enter application data, such as name and address (and optional State ID info such as Driver's License number and the like) 103, phone, birthdate and optional email info 104, an "always print receipt" option 105, and also remaining credit card or bank (checking) account info 106. The Customer is asked if they want to establish additional use limitations 108, such as by associating a photo 1600 with the account. When the photo is approved (accepted by a cashier as authentic to the particular customer signing up), or if they did not want any additional use limits, they are presented with a copy of a Terms of Agreement and Privacy policy 120, or the like, and asked if they accept the Terms or not 121. If they do not, the transaction is cancelled by sending a series 21 code 1300 (see FIG. 13) and a printed confirmation of the cancellation is optionally printed 122 for the customer and the process ends 199.

If the customer accepts the terms of use, a validate procedure 1100 (see FIG. 11) leading to a series 01 code return to the RTDA is initiated with the Processor. If the billing address entered does not match 107 the billing address on file for the card or other account, a 012 code is returned at a check code (also referred to as a valid or validity flag) step 130, and the customer has a chance to reenter the billing address. If the card or other method of payment is not accepted, an 013 code is returned, the customer is so informed 131, and asked if he wants to try a different form of payment or account to link 123, failing which the process proceeds to cancellation 1300 et seq; however if a new form of payment is indicated, then swipe or read step 110 et seq is repeated. If the account already has a maximum number of transponders allowed that are all already associated with the account, then a 014 code is returned telling the customer so 132, and likewise he is asked if he wants to try alternate payment 123, et seq.

If the card (and reference to such a card in this discussion, unless specified otherwise is also a reference to both credit and debit type cards and MICR encoded checking accounts) is approved, the Processor returns a 011 code and a new Transponder is dispensed 140.

Then follows the Transponder (account) activation step 1200 (see FIG. 12) which involves another communication with the Processor and a return of an 02 series code or flag. If an 022 code is returned it means the transponder dispensed is already associated with an active account ('already active') and the customer is invited to wave the transponder as second time for a confirming read 151 and step 1200 repeats. If an 023 code is returned, it means the transponder ID was not recognized by the Processor and the customer is invited 152 to call a help desk and the process ends 199. If an 021 code is returned, there is a confirmation 125 that everything matched up, and the account for the new RFID is now active and the RFID may be used immediately and the process ends 199. Optionally, before confirmation 125, the customer may sign up 1700 for a loyalty points option 1701, by creating a new loyalty account 1702, and checking the validity flag 1703 for an 11 series code. A 112 code means there already is an active loyalty link for the indicated RFID account and the confirmation 125 proceeds; if a 111 code is returned then a loyalty option activation step 1705 is initiated before confirmation 125.

Figure 2A:
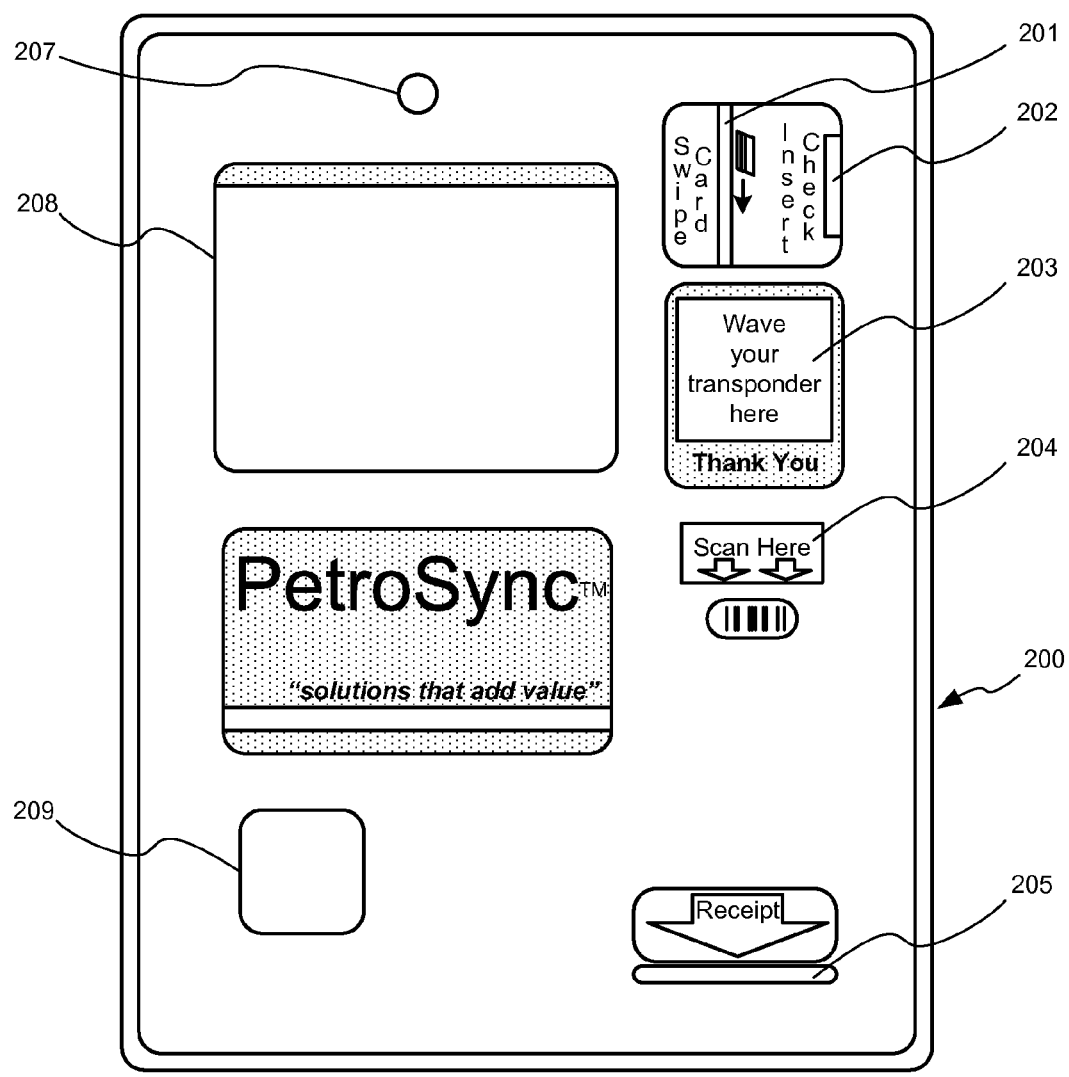
FIGS. 2a&b are embodiments of an apparatus for dispensing, activating and maintaining RFID transponders.
Figure 2B:
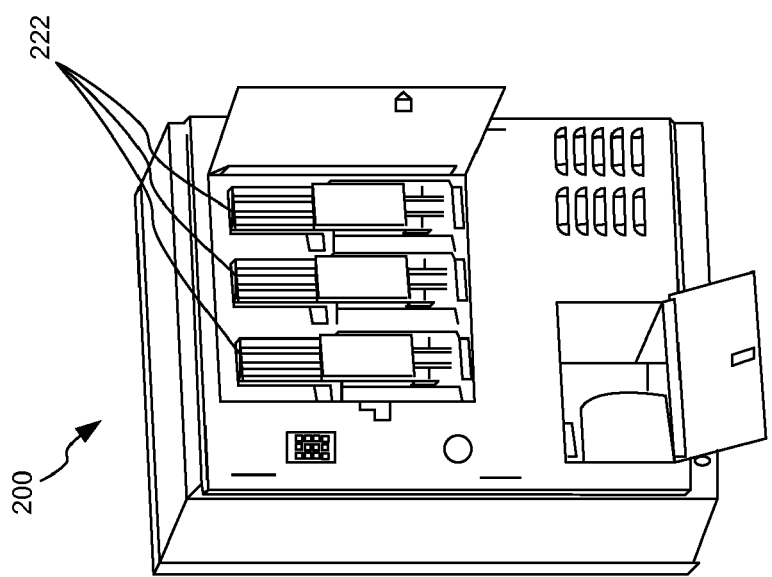
Figure 3B:
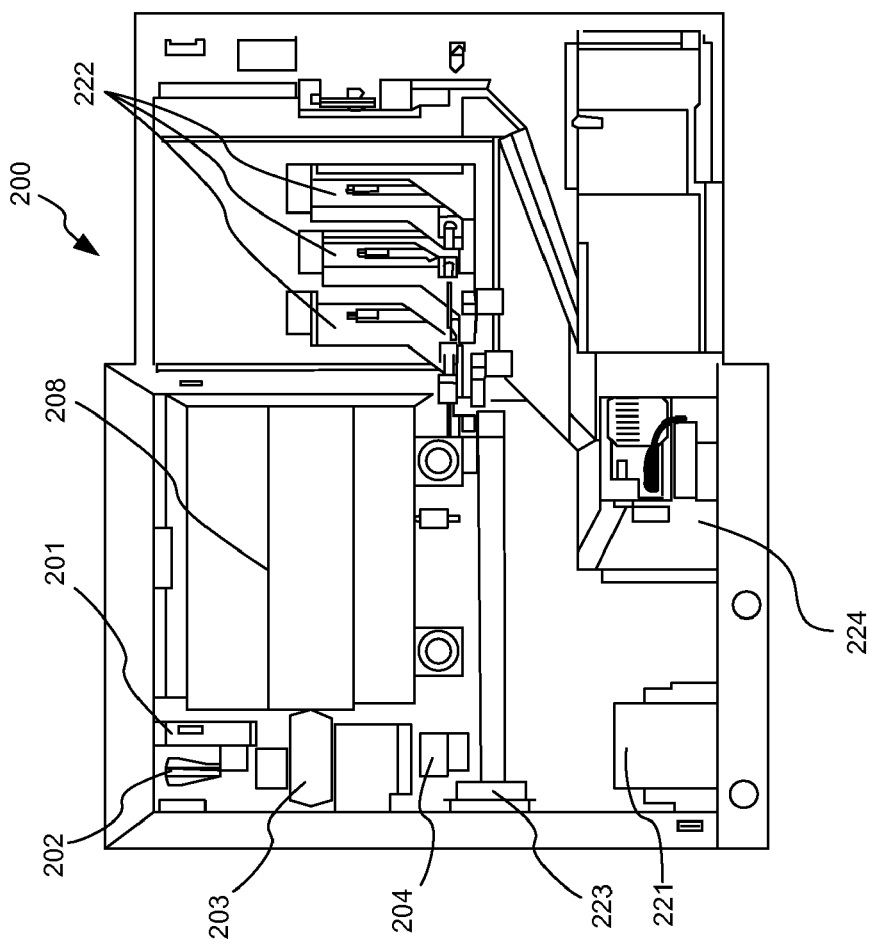
FIGS. 3a&b are alternate embodiments of an apparatus for dispensing, activating and maintaining RFID transponders.
Figure 3A:
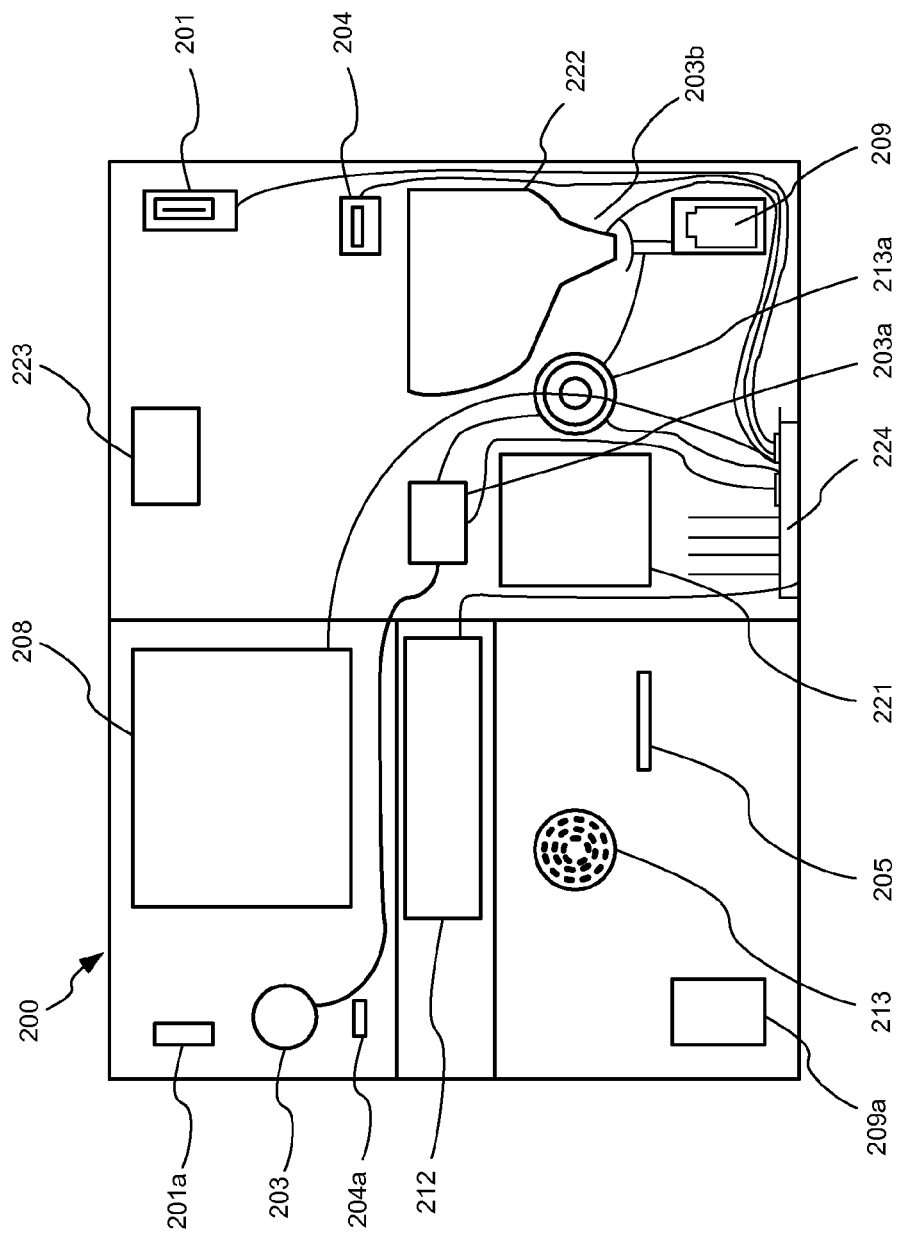

FIGS. 2a and 3a illustrate embodiments of an apparatus 200 for dispensing, activating and maintaining RFID transponders, sometimes referred to herein as the RFID Transponder Dispenser/Authorizer (RTDA), both outside front and inside views, respectively. FIGS. 3b and 2b are alternate embodiments showing interior and back side views respectively.

RTDA hardware components include credit card reader 201, MICR reader 202, RFID reader and antenna module 203 (including RFID reader and RFM unit 203a and antenna dish 203b), RFID transponder dispenser 222 having holding bin, dispensing mechanism, and drop tray 209, dispenser module 222 containing a plurality of RFID Transponders, CPU and mainboard 224 (with optional harddrive, Ethernet, video and sound subsystems), LCD touchscreen 208, barcode reader 204, printer 221 with printer paper output slot 205, optional web-type digital camera 207, optional brand panel 206, power supply 223, speaker 213a and speaker grill 213, case openings for the card and MICR readers 201a, for the bar code reader 204a and for the drop tray door 209a, and optional keyboard 212, all arranged substantially as illustrated, or arranged as may now or later occur to those skilled in the art to achieve best cost/performance ratio, and optimization of ergonomic and aesthetic factors, and the like.

RTDA software components include conventional communications software to enable interface with credit card authorizer network (Processor) and (optional) store POS systems, a customer interface application 400 (see FIG. 4) to enable the RFID application and maintenance processes, and logic system and controller software to manage the hardware components, and any RFID Transponder programming and reading.

FIGS. 5A through 5D show a flow chart of the process 500 of modifying and existing REID 5 account from the RTDA. First the existing activated Transponder is scanned 501 (the Transponder is waved or tapped at a Transponder reader); then the appropriate birthdate is entered 502. A validate transponder step 1400 (returning an 03 series code based on birthdate correspondence) is then run (see FIG. 14). If an 035 code is returned, it means the birthdate just entered does not match and the customer has another chance 505 to reenter it.

If anything other than an 031 code (Transponder is birthdate Valid—see discussion below) is returned, a separate routine, check Valid Flag 530 is run. If the code returned is 034, a Transponder not found notice 534 is given the customer and the process ends 599. If an 033 code is returned, a Transponders exceeded check 533 is run to see if the pre-set or pre-authorized number of Transponders for this account (preselected by customer or by Processor policy) has been exceeded.

If yes, a customer notice that this particular Transponder was previously cancelled 536 is given and the process ends 599; if not, the customer is told the Transponder was previously cancelled and has the option of reactivating it 540. This is the effect of an error checking routine that is believed to be advantageous; if the customer has previously cancelled a transponder he thought was lost, but that turns out to be for example simply on another keychain, and he now wants to use it after all, the processor sees this transponder as recently cancelled (not yet deleted from the database, but marked for such action) rather than just deleting the transponder account at this point, so long as the customer has not already exceeded his limit of transponders allowed on the payment account. This gives the customer the option of reinstating the transponder. However, if he has already replaced the transponder previously, or added new ones and is now at his maximum number, the option to reinstate this previously reported missing transponder will not be available, thus the "previously cancelled" message.

The maximum number of transponders is generally set in the merchant account per merchant's business rules. Such rules include transaction $ limits, automatic activation at RTDA vs. Cashier verification for activation, maximum number of transponders allowed per RFID account, various loyalty options, and the like.

If the customer chooses not to reactivate, confirmation of cancellation 522 and the process ends 599; if the choice is yes, the account info is displayed 541, and the card or MICR is read 510. If the account number associated with the Transponder is not the same as the account number just read 511 then the customer is asked to re-swipe or re-read the card originally used in the signup 512. If the account number matches, Terms of Use are again optionally presented 511 and accepted or not 521. If not a cancel transaction step 1300 is run, confirmation of cancellation is printed 522 and the process ends 599; if accepted (or if the step 521 is skipped), an Activate Transponder 1200 is run, a check valid flag 550 is done and confirmation of activation is run and optionally printed 525, and the process ends 599.

If 031 code is returned at step 520 above, the account info is displayed 524, and the card or MICR is read 510. If the account number associated with the Transponder is not the same as the account number just read 511 then the customer chooses whether to assign a new account 513 to the Transponder, and so, an assign new account to RFID step 800 (see FIGS. 8A and 8B) is run, the account is updated 503 and the process ends 699. If a new account is not to be assigned at step 513, then the customer is asked to re-swipe or re-read the card originally used in the signup 512. If customer chooses not to re-swipe, a cancel transaction step 1300 is run, confirmation of cancellation is printed 522 and the process ends 599.

If the account number associated with the Transponder is the same 511 as the account number just read at step 510 then the customer chooses 560 whether to update expiration date 561, change or add photo 1600 or change other account info. Update expiration date 561 is followed by an update RFID account process 900 (see FIG. 9), an account updated acknowledgment 503, and process end 599. If a photo is to be added or changed, a new photo is submitted and approved 1610 or not, and if approved, new Terms of Use are optionally presented 520 and the account is updated 900 and account updated confirmation 503 and process ends 599. If other account info is to be changed, then customer proceeds to enter application data, such as name and address (and optional State ID info such as Driver's License number and the like) 563, phone, birthdate and optional email info 564, an "always print receipt" option 565, and the account is updated 900 and account updated confirmation 503 and process ends 599. FIGS. 6A–6D show shows a flow chart of process 600 of adding an additional Transponder to an existing RFID account from the RTDA. First the new Transponder is scanned 601; then the appropriate birthdate is entered 602. A validate transponder step 1400 (returning an 03 series code based on birthdate correspondence) is then run. If an 035 code is returned, it means the birthdate just entered does not match and the customer has another chance 603 to reenter it.

Figure 6A:
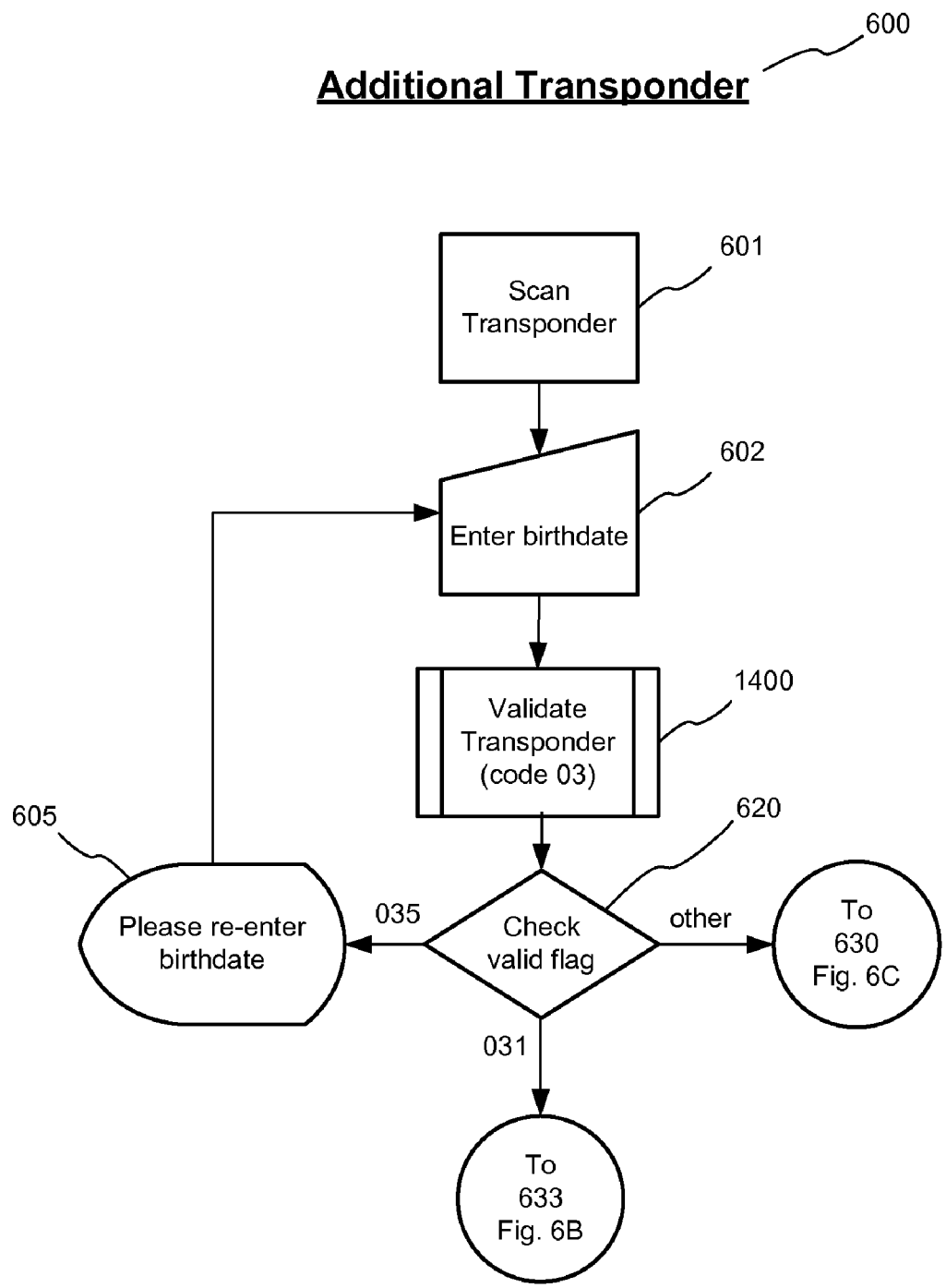
FIGS. 6A–6D are a flow chart of the Add Transponder process.
Figure 6B:
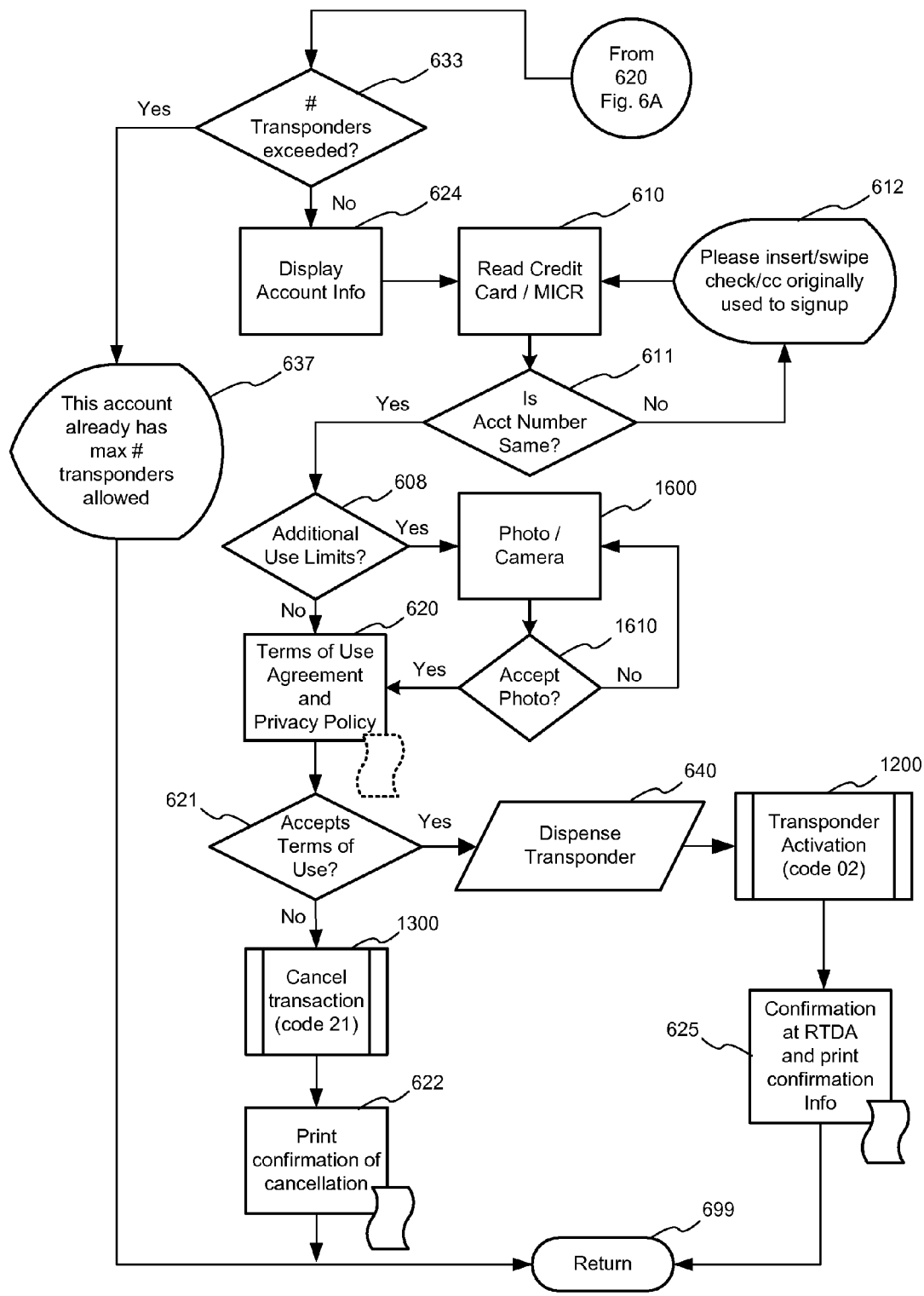
Figure 6C:
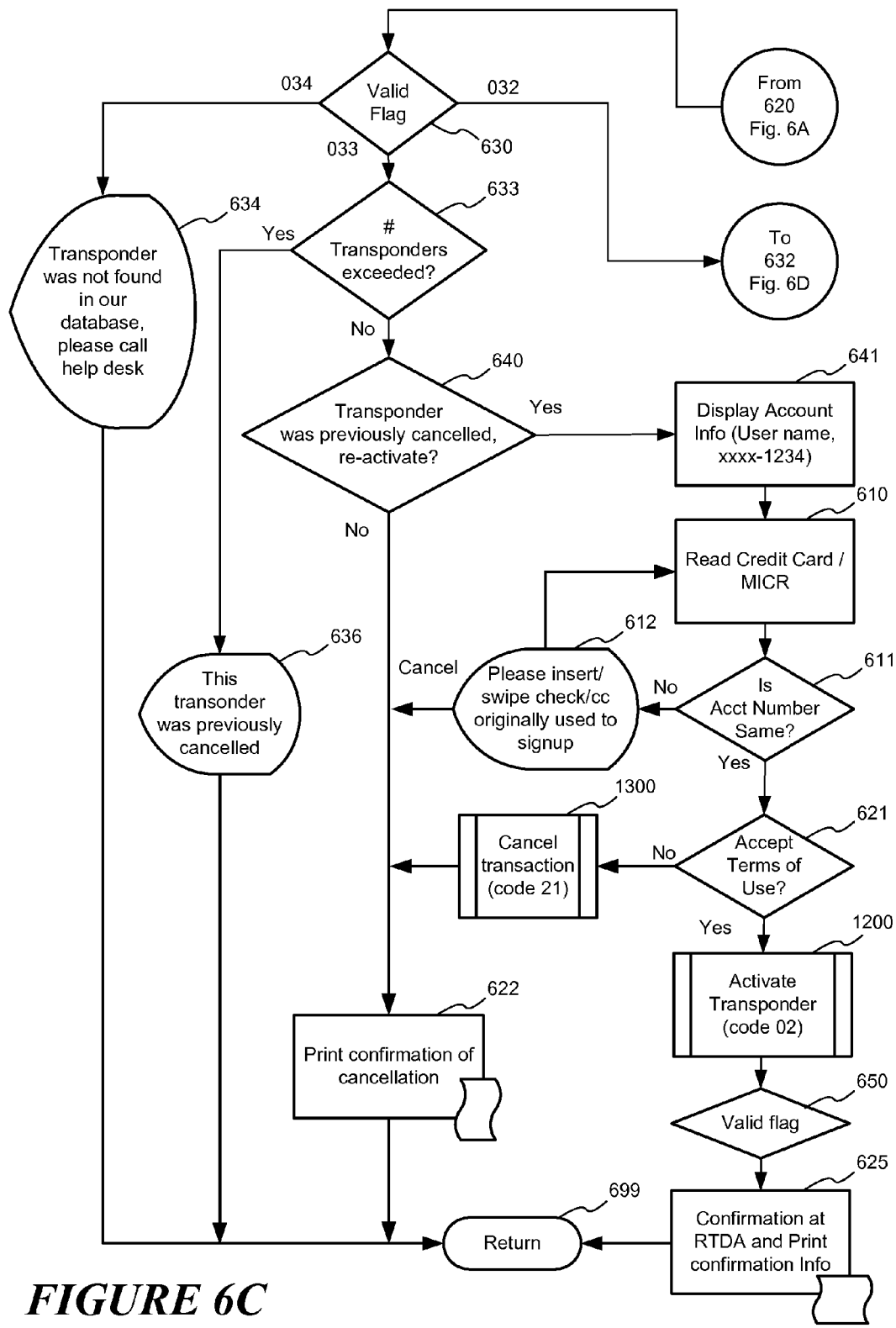
Figure 6D:
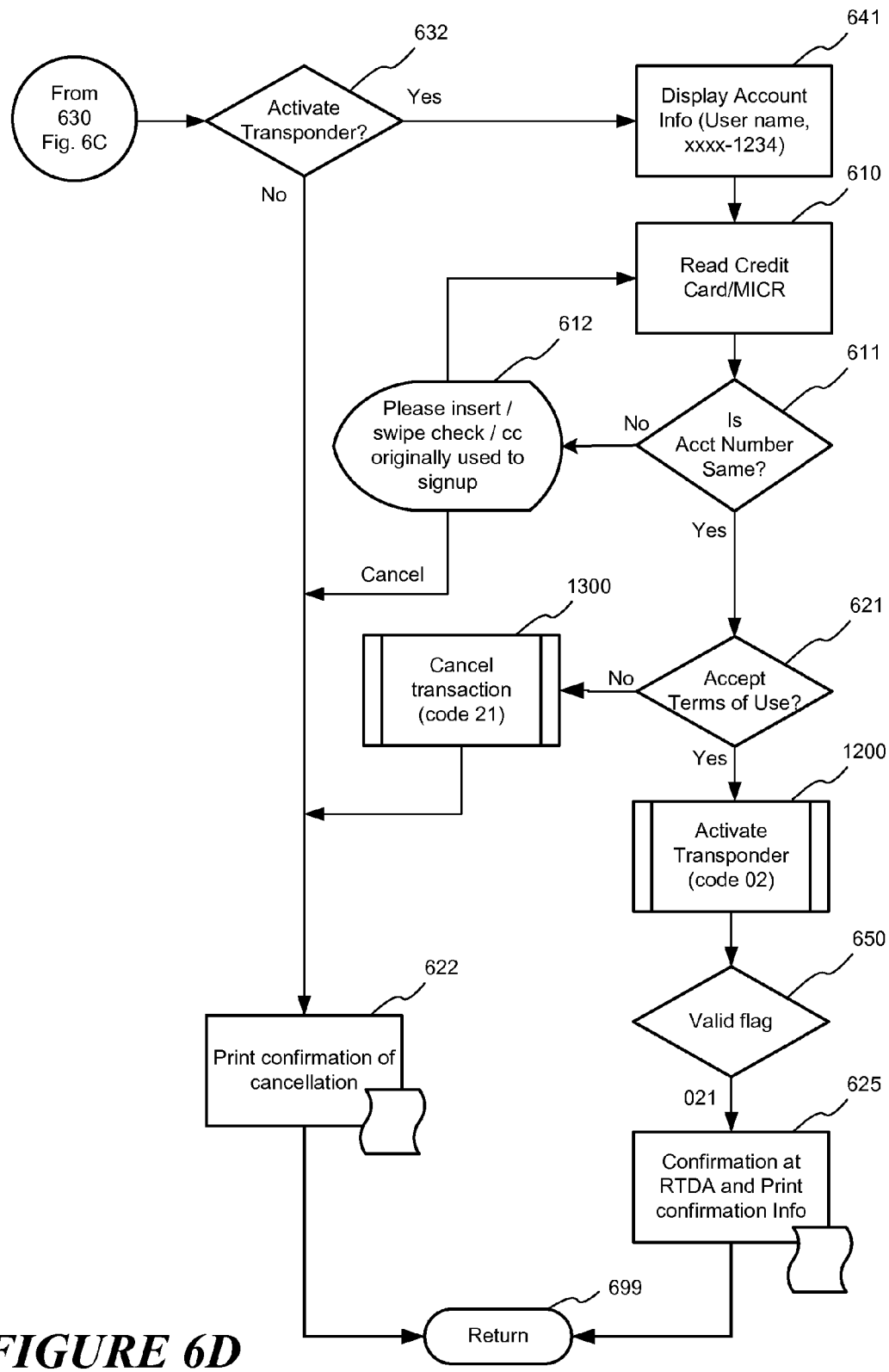

If anything other than an 031 code (see discussion below) is returned, a check Valid Flag 530 is run (See FIGS. 5A–5D though processes in FIGS. 6A and 6B are not necessarily the same as for FIGS. 5A–5D, this latter process 530 is identical to the illustrated 630 process).

If an 031 code is returned, a Maximum number of Transponders is evaluated 633. If this additional Transponder would exceed the maximum number allowed, the customer is so notified 637, and the process ends 699; if the maximum number allowed is not exceeded, then the account info is displayed 624, and the card or MICR is read 610. If the account number associated with the Transponder is not the same as the account number just read 611 then the customer is asked to re-swipe or re-read the card originally used in the signup 612. If the account number associated with the Transponder is the same 611 as the account number just read at step 610 then the customer chooses 608 whether to add additional use limitations for this new Transponder (see FIGS. 1A and 1B for discussion and options here). If no additional use limitations, then new Terms of Use are optionally presented 620 and if not accepted a cancel transaction process 1300 is run, with confirmation 622, and process ends 699. If Terms are accepted, a new Transponder is dispensed 640, followed by activation step 1200 and confirmation 625 and process ends 699.

Figure 7A:
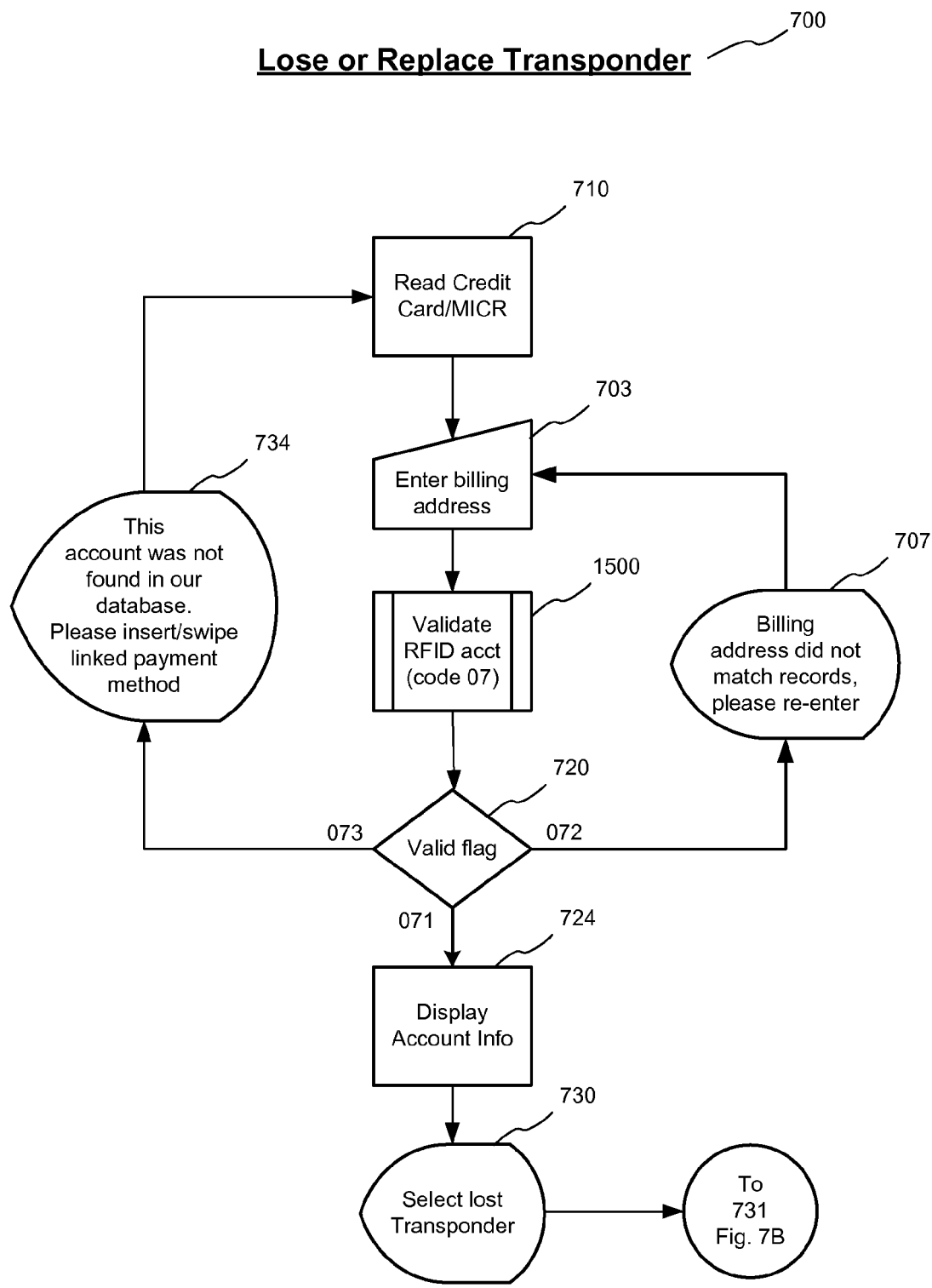
FIGS. 7A and 7B are a flow chart of the Lost Transponder process.
Figure 7B:
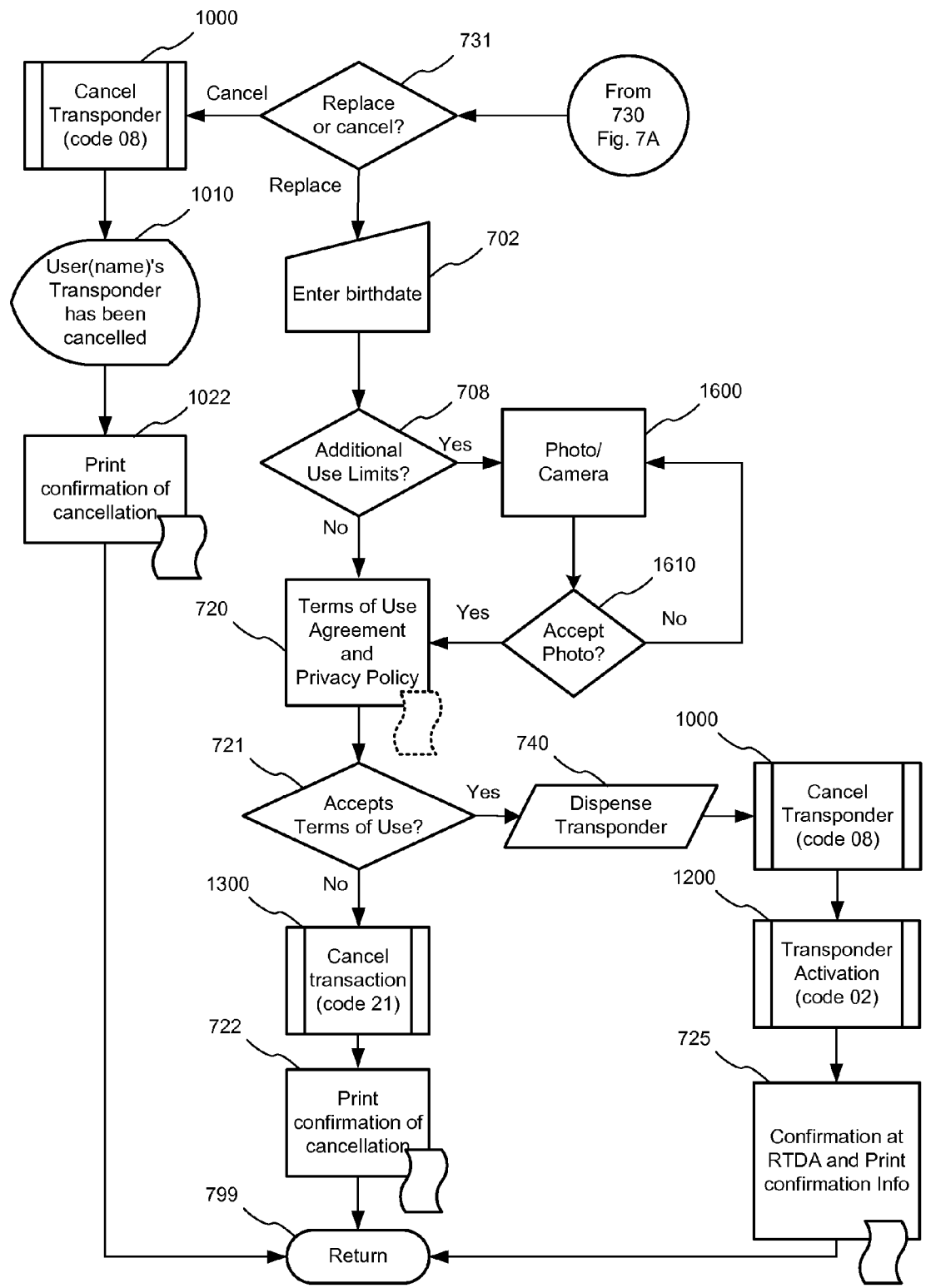

FIGS. 7A and 7B show a process 700 for replacing or cancelling a lost Transponder. First the card or MICR associated with the lost Transponder is read 710 and confirming billing address is entered 703, followed by a validate RFID account process 1500 (see FIG. 15). If the address entered does not match the address on in the Processor record for the customer, an 072 code is returned and a billing address non-match notice 707 is given. If there is no valid account as swiped on record, an 073 code is returned and an account not found notice is given 734. Otherwise an 071 code is returned and account info is displayed 724.

The particular Transponder lost is selected 730 from a list presented (if there is more than one Transponder registered to the customer EFID account), and the customer chooses to replace or just cancel the lost Transponder 731. If it is to be cancelled, a cancel Transponder process 1000 is run, followed by notice that the Transponder has been cancelled 1010 and optionally printed confirmation 722. If it is to be replaced, a birthdate is requested 702, additional use limits are inquired of 708, and Terms of Agreement are again preferably presented 720 Upon acceptance, a replacement Transponder is dispensed 740, the old Transponder is cancelled 1000, the new Transponder is activated 1200, with confirmation 725 and process ends 799.

Figure 8A:
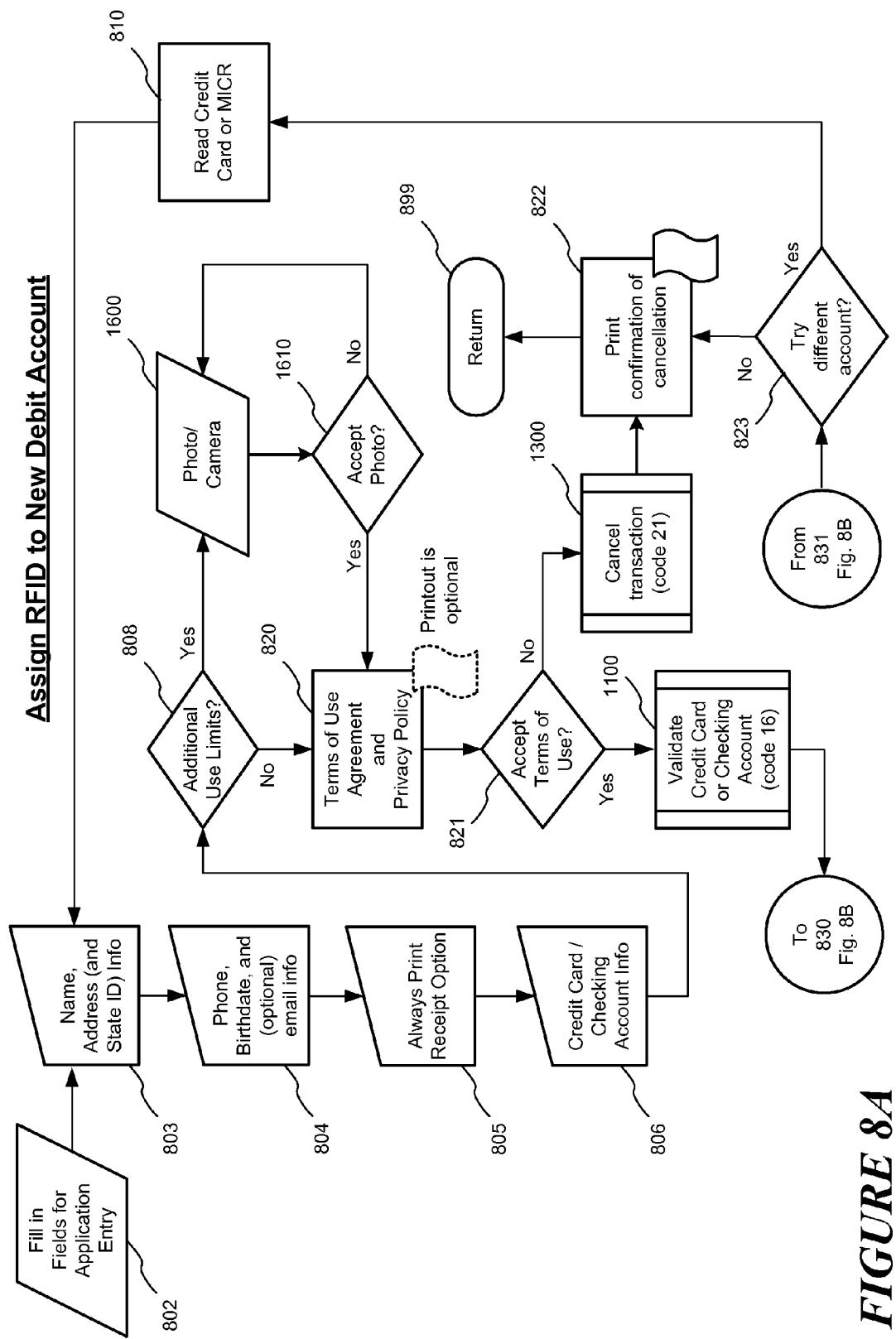
FIGS. 8A and 8B are a flow chart of the Assign RFID to new account process.
Figure 8B:
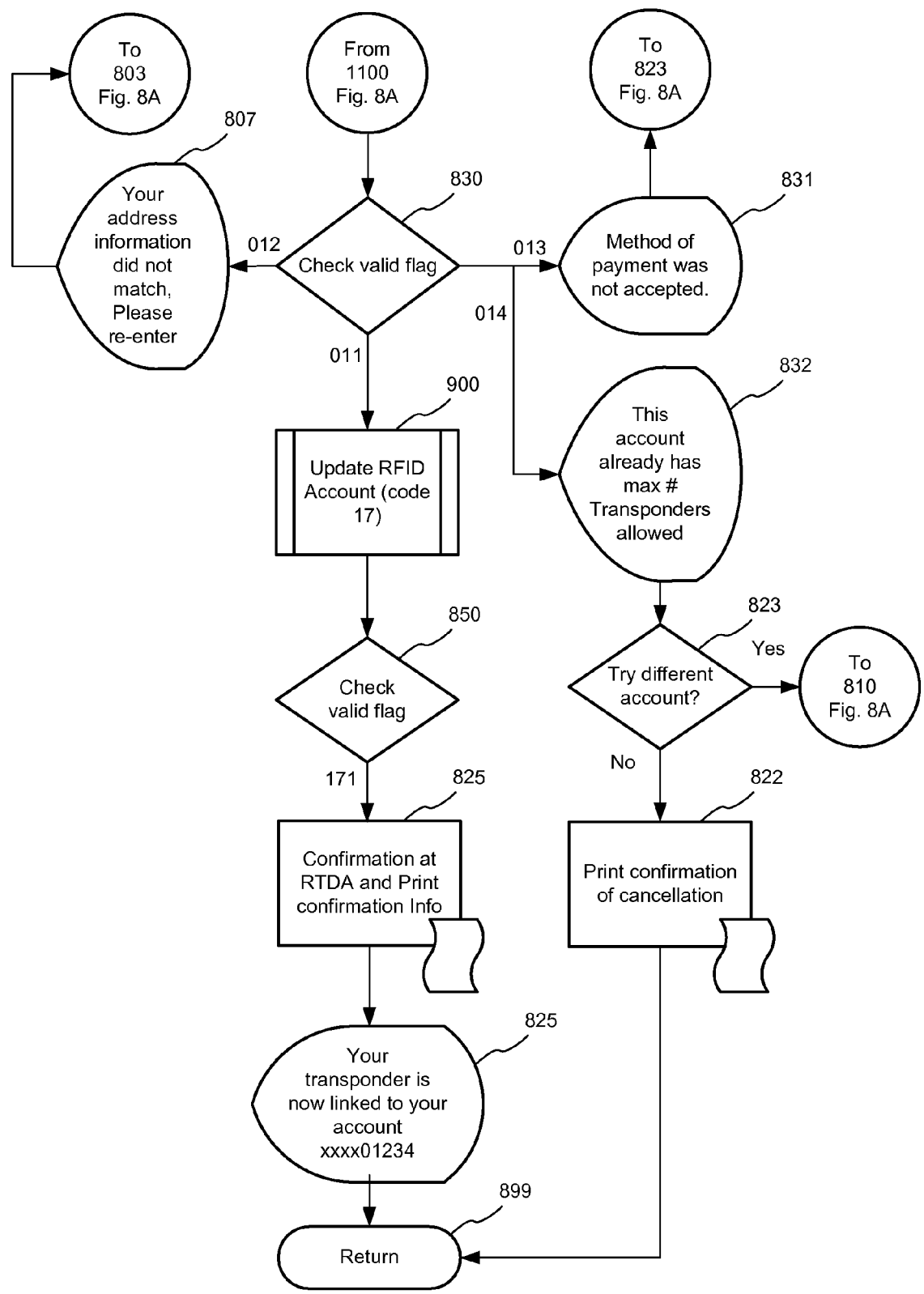
Figure 10:
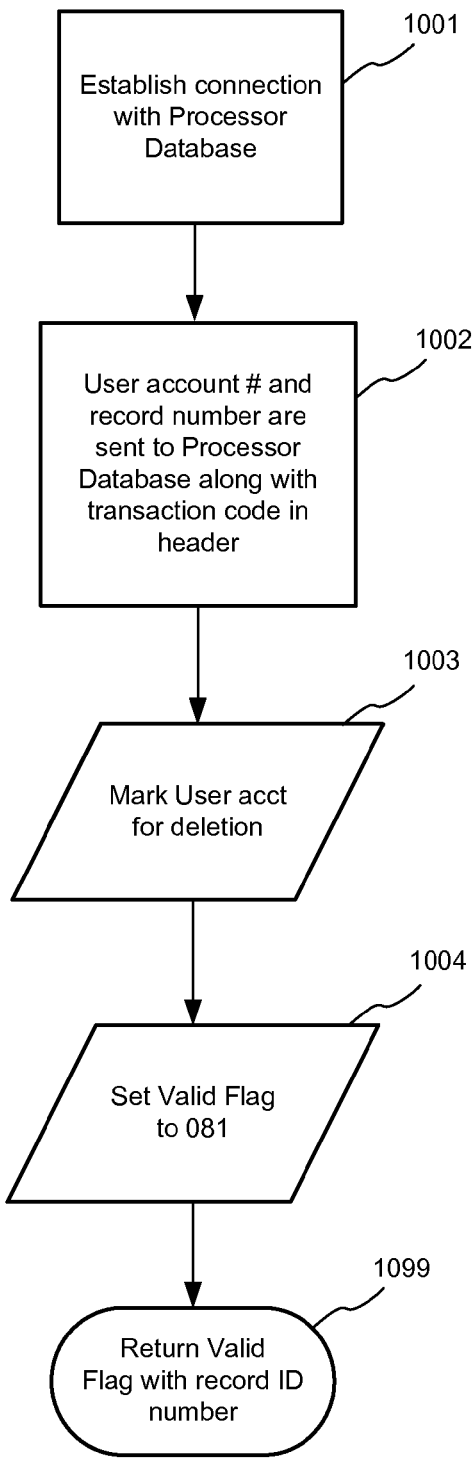
FIG. 10 is a flow chart of the Cancel Transponder process.

FIGS. 8A and 8B, and 10 are selected maintenance processes selected at step 410 in FIG. 4.

FIGS. 8A and 8B show a flow chart of the maintenance process 800 of assigning a new credit, debit or checking account to an already activated RFID Transponder and its associated record in the REID database. Note that account information from the existing Debit account is optionally displayed to assist the customer during the input process. As with the process illustrated in FIGS. 1A and 1B, input information including credit card ISO or MICR ABA information that has been read is preferably stored in volatile onboard memory. Information is also preferably cleared from memory upon uploading to the processor database.

The customer can fill in fields on screen for application entry 802; otherwise, the customer swipes a credit or debit card or MICR encoded check 810 in an appropriate reader, and then proceeds to enter application data, such as name and address (and optional State ID info such as Driver's License number and the like) 803, phone, birthdate and optional email info 804, an "always print receipt" option 805, and also remaining credit card or bank (checking) account info 806. The Customer is asked if they want to establish additional use limitations 808 for the new account, such as by associating a photo 1600 with the account. When the photo is approved, or if they did not want any additional use limits, they are presented with a copy of a Terms of Agreement and Privacy policy 820, and asked if they accept the Terms or not 821. If not, the transaction is cancelled by sending a series 21 code 1300 and a printed confirmation of the cancellation is optionally printed 822 for the customer and the process ends 899.

If the customer accepts the terms of use, a validate procedure 1100 leading to a series 01 code return to the RTDA is initiated with the Processor. If the billing address entered does not match 807 the billing address on file for the card or other account, a 012 code is returned at a check code step 830, and the customer has a chance to reenter the billing step 830. If the card or other method of payment is not accepted, an 013 code is returned, the customer is so informed 831, and asked if he wants to try a different form of payment or account to link 823, failing which the process proceeds to cancellation 1300 et seq; however if a new form of payment is indicated, then swipe or read step 810 et seq is repeated. If the account already has a maximum number of transponders allowed that are all already associated with the account, then a 014 code is returned telling the customer so 832, and likewise he is asked if he wants to try alternate payment 823, et seq. For example, the customer may already have Transponders linked to more than one credit card or checking account. If he has 3 (assume max=3) transponders linked to his MasterCard and 1 linked to his checking account, and he goes through this routine to change his one linked to checking to link to the same MasterCard, he will be notified that his MasterCard already has the maximum number allowed, and he will be offered to link to a different account (such as another Visa) or to leave it as is.

If the card is approved, the Processor returns a 011 code and an update account process 900 is run to return a series 17 code. If a 171 code is returned to the check flag step 850, indicating account validity and acceptance by the processor and replacement of the old payment account with the new one, then the customer is so notified 825 and given an additional new account now linked to Transponder xxxx notice 826 and process ends 899.

Figure 9:
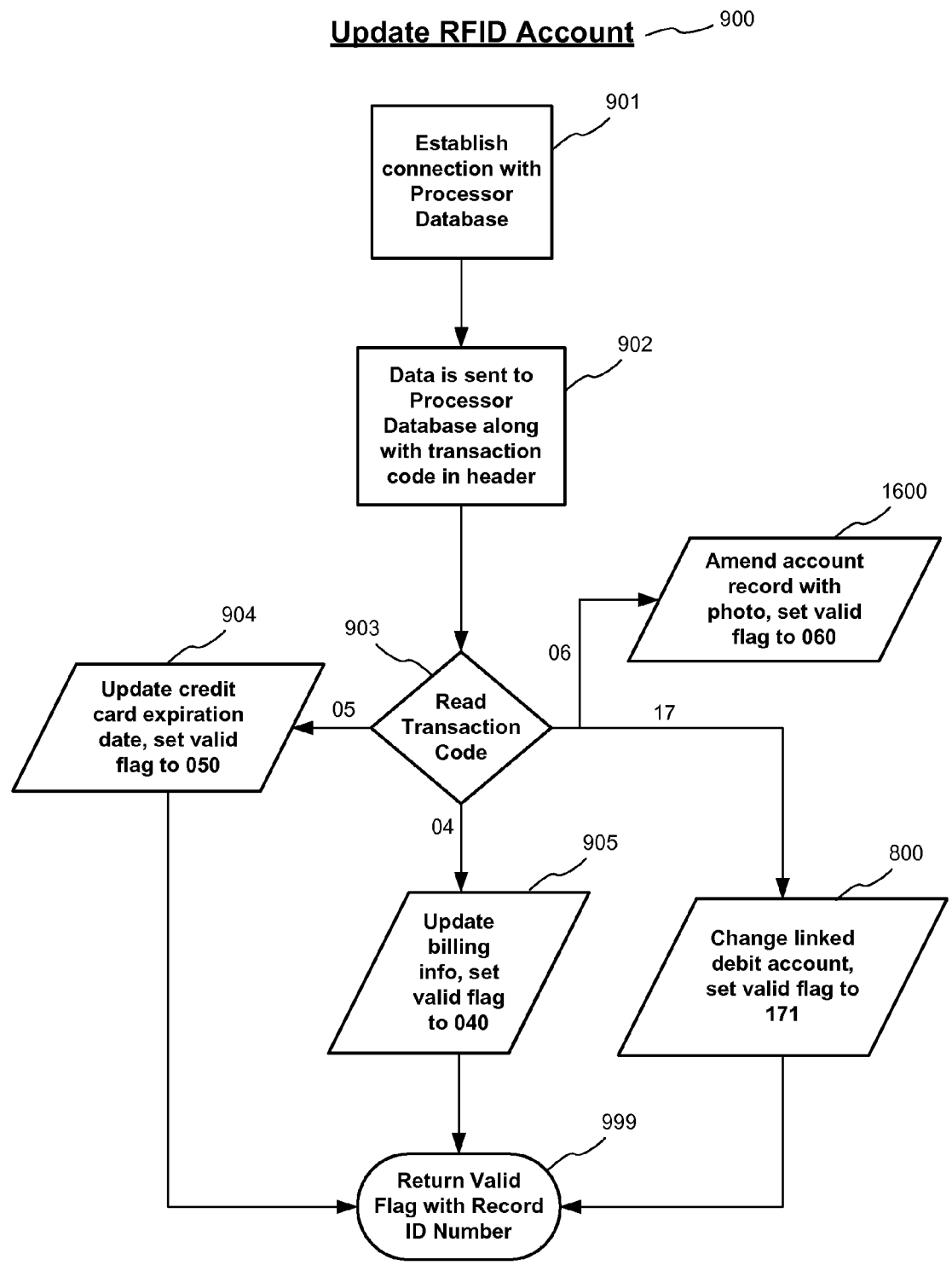
FIG. 9 is a flow chart of the Update RFID process.

The update RFID account process 900 shown in FIG. 9 can be run as a customer service at any time, as well as being called by several other processes, as discussed above. First, a connection is established 901 with the processor, and data is sent to the processor database 902 along with a transaction code in the data header for this transaction. The processor reads the transaction code, and if it is for updating card expiration 904, a flag code 050 is returned with RecLocID 999; if for updating billing info 905, a flag code 040 is returned with RecLocID 999; if for changing the linked account, a flag code 171 is returned with RecLocID 999; if for amending the account record with a photo, a flag code 060 is returned with RecLocID 999.

The cancel Transponder process 1000 shown in FIG. 10 can also be run as a customer service at any time, as well as being called by several other processes, as discussed above. First, a connection is established 1001 with the processor, and data is sent to the processor database 1002 along with a transaction code in the data header for this transaction. The Transponder ID is marked for deletion 1003, and if there is only one Transponder registered on the customer account, the account itself is selectably marked for deletion. An 081 code is returned along with RecLocID 1099.

Figure 11:
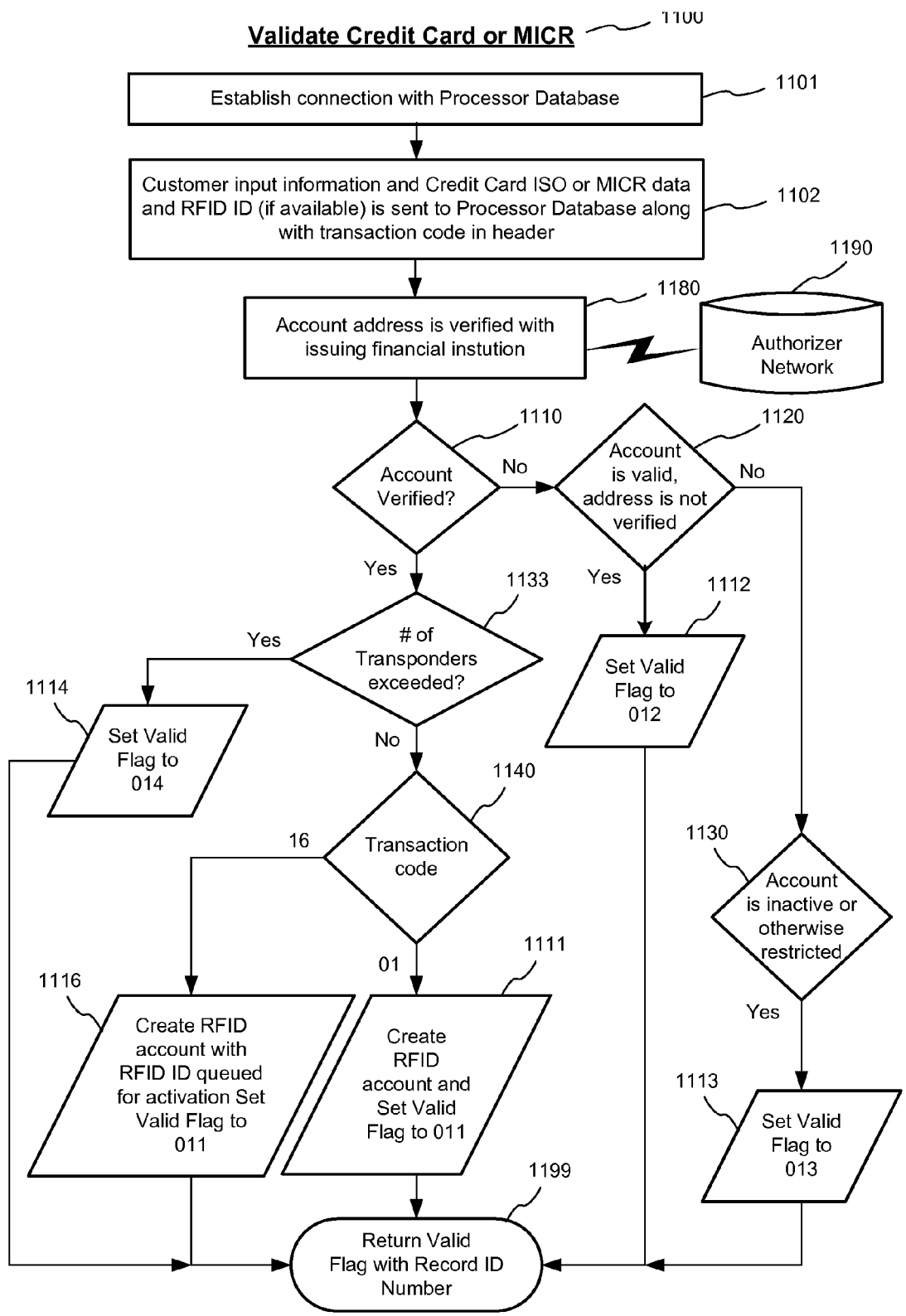
FIG. 11 is a flow chart of the Validate Credit Card process.

The validate card or MICR process 1100 shown in FIG. 11 is generally only called by the several other processes discussed above. First, a connection is established 1101 with the processor, and data is sent to the processor database 1102 along with a transaction code in the data header for this transaction. The account address for the card or MICR is verified 1180 via a conventional authorizer network 1190.

If verified 1110, a check on maximum number of Transponders 1133 is run and if exceeded 1114, an 014 code is return to the RTDA with RecLocID 1199. Again, by way of example, a customer may wish to use a credit card or checking account that is already linked with other Transponders to sign up for a Transponder through the new signup process. Thus the maximum number of transponders allowed on this card may be exceeded. Otherwise, the transaction code is reviewed 1140 and if it's for an RFID account already queued for activation (16), an 011 code is returned; it's for an RFID account to be created(01), an 011 code is also returned, and in either case, to the RTDA with RecLocID 1199.

If the card number is not verified, only because the address as entered at the RTDA does not match the financial institutions records 1120, an 012 code is returned 1112 to the RTDA with RecLocID 1199. If the card account is inactive or otherwise restricted, an 013 code is returned 1113 to the RTDA with RecLocID 1199.

Figure 12:
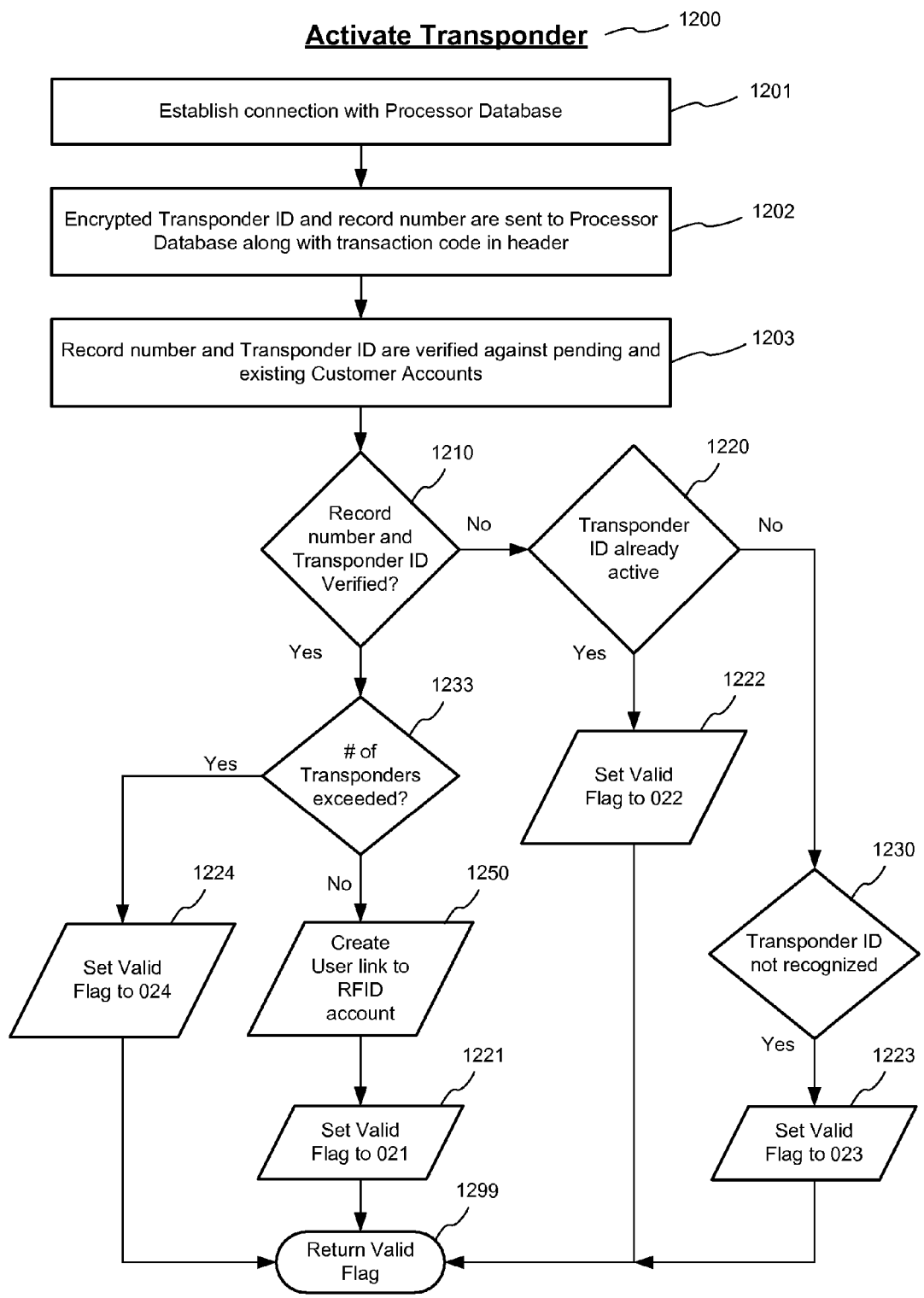
FIG. 12 is a flow chart of the Activate Transponder process.

The activate transponder process 1200 shown in FIG. 12 is also generally only called by the several other processes discussed above. First, a connection is established 1201 with the processor, and Transponder ID and record number data, preferably conventionally encrypted is sent to the processor database 1202 along with a transaction code in the data header for this transaction. The record number and Transponder ID are verified 1210.

If verified 1210, a check on maximum number of Transponders 1233 is run and if exceeded 1224, an 024 code is returned to the RTDA with RecLocID 1299. Otherwise, the Transponder ID is linked to the customer's RFID account record in the processor database 1250 and an 021 code 1221 is returned 1299.

If not verified, a check to see if the Transponder ID is already active is run 1220, and if so, an 022 code 1222 is returned 1299. If not already active, but the ID is not recognized as a valid ID, an 023 code 1223 is returned 1299.

Figure 13:
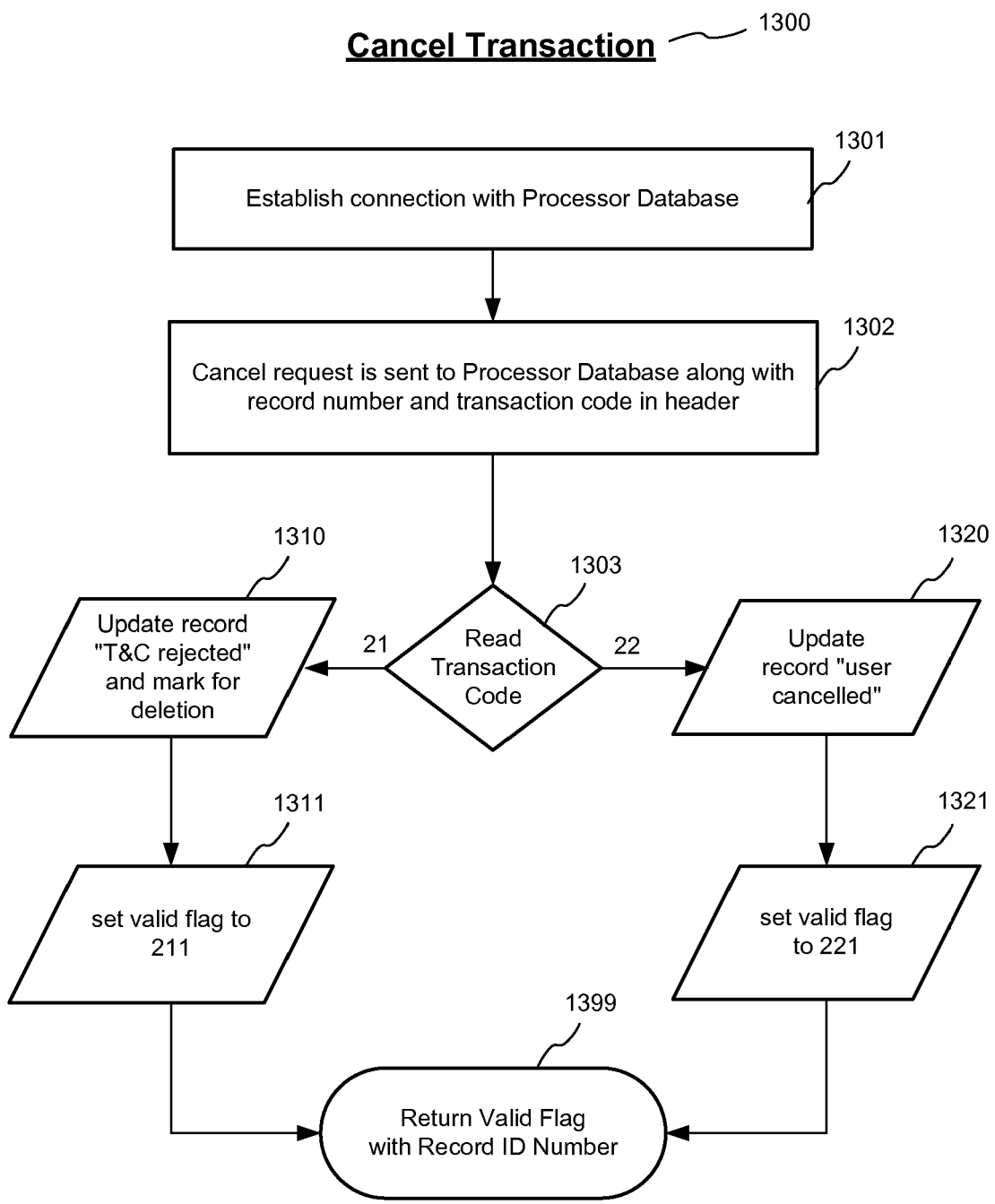
FIG. 13 is a flow chart of the Cancel Transaction process.

The cancel transaction process 1300 shown in FIG. 13 is also generally only called by the several other processes discussed above. First, a connection is established 1301 with the processor, and a cancel request is sent to the processor database 1302 along with a transaction code in the data header for this transaction.

The transaction code is reviewed 1303 and if it's for Terms of Use rejected (21) 1310, the record is marked for deletion, and an 211 code 1311 is returned; it's for user cancelled (22) 1320, an 221 code is returned, and in either case, to the RTDA with RecLocID 1399.

Figure 14:
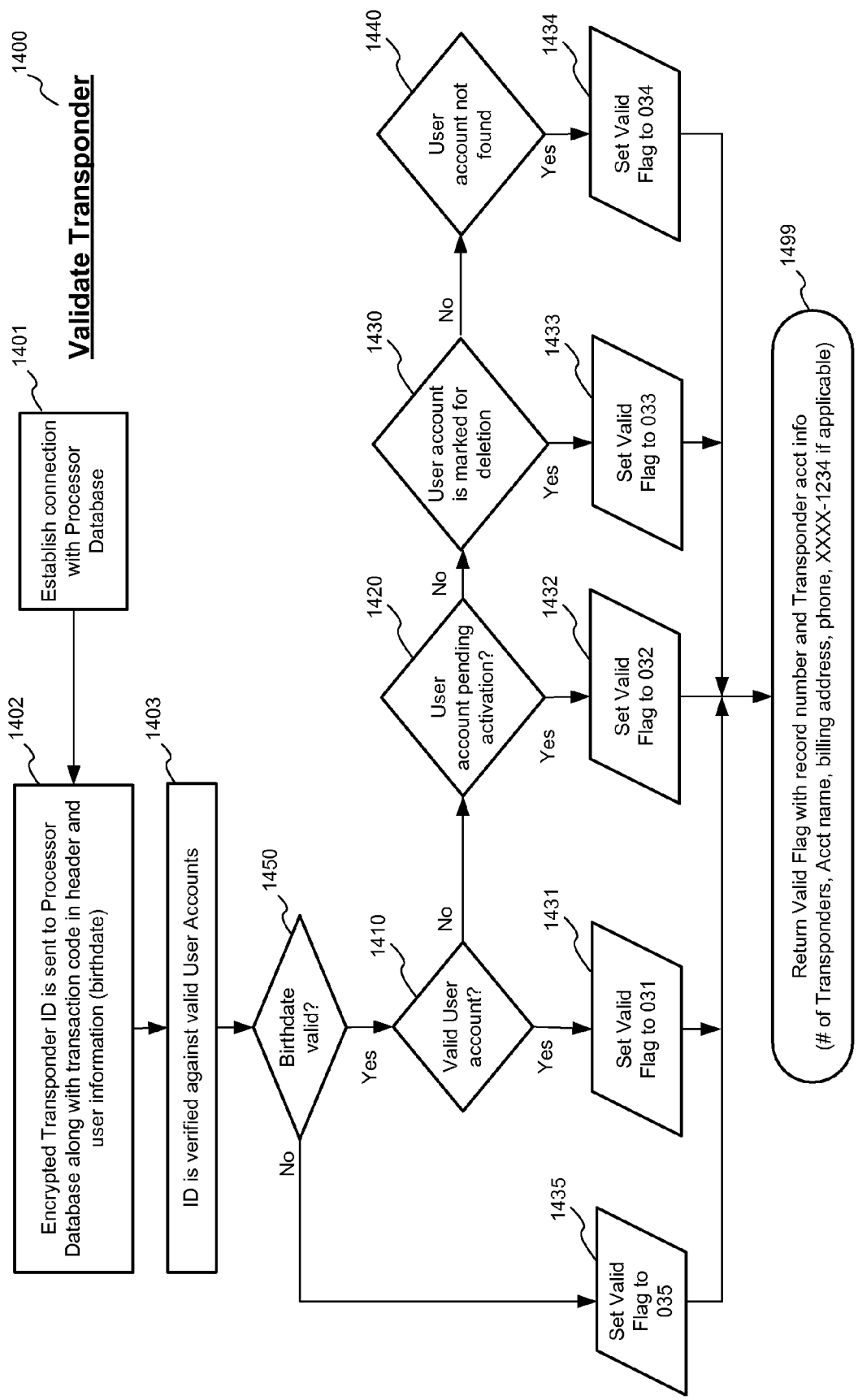
FIG. 14 is a flow chart of the Validate Transponder process.

The Validate Transponder process 1400 shown in FIG. 14 is generally only called by several of the processes referred to above, such as the modify account process 500 and the add Transponder process 600, and may later be called by other processes. First, a connection is established 1401 with the processor, and Transponder ID and selected user info such as birthdate, preferably conventionally encrypted is sent to the processor database 1402 along with a transaction code in the data header for this transaction. The Transponder ID are verified against valid customer accounts 1403.

If not verified 1450, an 035 code is returned 1435 with RecLocID and other Transponder account info 1499. If verified, a check is run to see if there is a valid user account 1410, and if so, an 031 code is returned 1431 with RecLocID and other Transponder account info 1499. If there is no current valid user account, a check is run to see if the account is queued and pending activation 1420, and if so, an 032 code is returned 1432 with RecLocID and other Transponder account info 1499. If the account is not found to be pending 1420, a check is run to see if the account is marked for deletion 1430, and if so, and 033 code is returned 1433 with RecLocID and other Transponder account info 1499. If not marked for deletion and the account is otherwise not found 1440, an 034 code is returned 1434 with RecLocID 1499.

Figure 15:
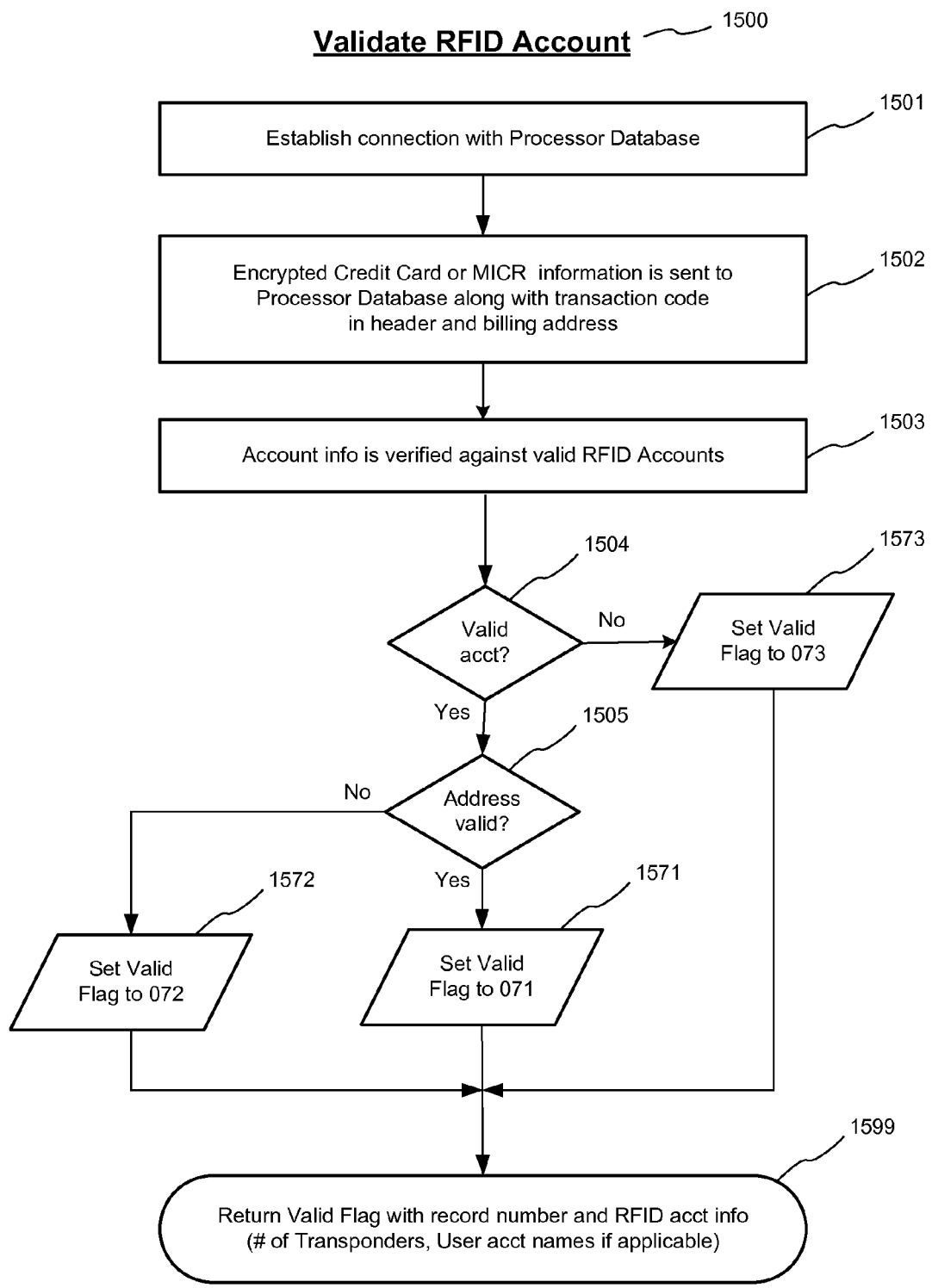
FIG. 15 is a flow chart of the Validate RFID process.

The validate RFID account process 1500 shown in FIG. 15 is generally only called by the lost Transponder process 700. First, a connection is established 1501 with the processor, and card data including billing address, preferably conventionally encrypted, is sent to the processor database 1502 along with a transaction code in the data header for this transaction. The account info is verified against valid customer accounts 1503.

If not verified 1504, an 073 code is returned 1573 with RecLocID 1599. If verified, a check is run to see if the address is valid 1505, and if so, an 071 code is returned 1571 with RecLocID and other Transponder account info 1499. If the address is not valid, an 072 code is returned 1572 with RecLocID and other Transponder account info 1599.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A method, comprising:
    identifying a transponder configured to provide a unique identifier to a reader without physically becoming in contact with the reader;
    presenting a user interface configured to receive from the user information including account information for at least one payment account the user desires to associate with the unique identifier;
    providing a local reader, wherein the transponder is previously encoded with the unique identifier, and the local reader reads the unique identifier for purposes of associating the at least one payment account with the unique identifier;
    verifying a validity of the user information;
    associating the user information with the unique identifier; and
    dispensing the transponder to the user.

2. A method of claim 1, wherein the unique identifier provided by the transponder is associated with more than one payment account.

3. A method of claim 1, wherein the at least one payment account includes one of:
    a credit card account;
    a debit card account;
    a bank account; and
    a loyalty points account.

4. A method of claim 1, wherein the user interface receives the user information from an input device including at least one of:

a magnetic strip reading device;
a magnetic ink character reading device;
a bar code reading device;
a user entry device; and
a digital imaging device.

5. A method of claim 4, wherein verifying the validity of the user information includes one of:
   determining whether the payment account is active;
   determining whether the payment account is in good standing;
   determining whether information entered by the user via the user entry device matches the user information associated with associated information presented by a magnetic strip, magnetic ink characters, and a bar code presented by the user for verification; and
   determining whether the user information received via the user entry device corresponds with account information associated with the payment account.

6. A method of claim 5, wherein verifying the validity of the user information is conducted by engaging a network.

7. A method of claim 4, wherein the user information includes one of:
   a driver's license number;
   a birth date;
   a billing address;
   an encrypted value; and
   image data.

8. A method of claim 7, wherein at least a portion of the user information is used as security information to validate use of the transponder.

9. A method of claim 1, wherein the user information is associated with the unique identifier in a network.

10. A method of claim 1, further comprising associating security information with the unique identifier.

11. A method of claim 1, further comprising associating a loyalty points account with the unique identifier.

12. A method, comprising:
   identifying a transponder configured to provide a unique identifier to a reader without physically becoming in contact with the reader;
   presenting a user interface configured to receive from the user information including account information for at least one payment account the user desires to associate with the unique identifier, wherein the user interface receives the user information from an input device including at least one of:
     a magnetic strip reading device;
     a magnetic ink character reading device;
     a bar code reading device;
     a user entry device; and
     a digital imaging device;
   verifying a validity of the user information, including at least one of:
     determining whether the payment account is active;
     determining whether the payment account is in good standing;
     determining whether information entered by the user via the user entry device matches the user information associated with information presented by a magnetic strip, magnetic ink characters, and a bar code presented by the user for verification; and
     determining whether the user information received via the user entry device corresponds with account information associated with the payment account;
   associating the user information with the unique identifier; and
   dispensing the transponder to the user.

13. A method of claim 12, wherein the unique identifier provided by the transponder is associated with more than one payment account.

14. A method of claim 12, further comprising providing a local reader, wherein the transponder is previously encoded with the unique identifier, and the local reader reads the unique identifier for purposes of associating the at least one payment account with the unique identifier.

15. A method of claim 12, wherein the at least one payment account includes one of:
   a credit card account;
   a debit card account;
   a bank account; and
   a loyalty points account.

16. A method of claim 12, wherein the user information includes one of:
   a driver's license number;
   a birth date;
   a billing address;
   an encrypted value; and
   image data.

17. A method of claim 12, wherein at least a portion of the user information is used as security information to validate use of the transponder.

18. A method of claim 12, wherein the user information is associated with the unique identifier in a network.

19. A method of claim 12, further comprising associating a loyalty points account with the unique identifier.

20. A method, comprising:
   identifying a transponder configured to provide a unique identifier to a reader without physically becoming in contact with the reader;
   presenting a user interface configured to receive from the user information including account information for at least one payment account the user desires to associate with the unique identifier, wherein the user interface receives the user information from an input device including at least one of:
     a magnetic strip reading device;
     a magnetic ink character reading device;
     a bar code reading device;
     a user entry device; and
     a digital imaging device;
   verifying a validity of the user information by engaging a network, including at least one of:
     determining whether the payment account is active;
     determining whether the payment account is in good standing;
     determining whether information entered by the user via the user entry device matches the user information associated with information presented by a magnetic strip, magnetic ink characters, and a bar code presented by the user for verification; and
     determining whether the user information received via the user entry device corresponds with account information associated with the payment account;
   associating the user information with the unique identifier; and
   dispensing the transponder to the user.

* * * * *